US012374206B2

(12) United States Patent
Parent et al.

(10) Patent No.: US 12,374,206 B2
(45) Date of Patent: Jul. 29, 2025

(54) FIRE DETECTION SYSTEM

(71) Applicant: OneEvent Technology, Inc., Mount Horeb, WI (US)

(72) Inventors: Daniel Ralph Parent, Mount Horeb, WI (US); Kurt Joseph Wedig, Mount Horeb, WI (US)

(73) Assignee: OneEvent Technologies, Inc., Mount Horeb, WI (US)

( * ) Notice: Subject to any disclaimer, the term of this patent is extended or adjusted under 35 U.S.C. 154(b) by 592 days.

(21) Appl. No.: 17/738,780

(22) Filed: May 6, 2022

(65) Prior Publication Data

US 2022/0262221 A1 Aug. 18, 2022

Related U.S. Application Data

(63) Continuation of application No. 16/156,908, filed on Oct. 10, 2018, now Pat. No. 11,328,569.

(60) Provisional application No. 62/570,774, filed on Oct. 11, 2017.

(51) Int. Cl.

| | |
|---|---|
| ***G08B 17/10*** | (2006.01) |
| ***G08B 21/18*** | (2006.01) |
| ***G08B 25/00*** | (2006.01) |
| ***G08B 29/18*** | (2006.01) |

(52) U.S. Cl.
CPC .......... *G08B 17/10* (2013.01); *G08B 21/182* (2013.01); *G08B 25/009* (2013.01); *G08B 29/186* (2013.01); *G08B 29/188* (2013.01)

(58) Field of Classification Search
CPC .... G08B 17/10; G08B 21/182; G08B 25/009; G08B 29/186; G08B 29/188
See application file for complete search history.

(56) References Cited

U.S. PATENT DOCUMENTS

2017/0169683 A1* 6/2017 Ryder .................. G01J 5/0846
2017/0236231 A1* 8/2017 Kershaw ............. G06Q 50/265 705/325
2018/0308236 A1* 10/2018 Jales Costa .............. G06T 7/11

* cited by examiner

*Primary Examiner* — James J Yang
(74) *Attorney, Agent, or Firm* — Kenneth A. Smith

(57) ABSTRACT

A method includes receiving sensor data over time from each node of a plurality of sensory nodes located within a building. The method also includes determining a sensor specific abnormality value for each node of the plurality of sensory nodes. The method further includes determining, a building abnormality value in response to a condition where the sensor specific abnormality value for multiple nodes of the plurality of sensory nodes exceeds a threshold value. The method also includes causing an alarm to be generated based on the building abnormality value.

20 Claims, 18 Drawing Sheets

FIRE DETECTION SYSTEM

CROSS-REFERENCE TO RELATED PATENT APPLICATIONS

The present application is a continuation of U.S. patent application Ser. No. 16/156,908, filed Oct. 10, 2018, which claims priority to U.S. Provisional Patent Application No. 62/570,774, filed Oct. 11, 2017, each of which are hereby incorporated by reference in their entirety.

BACKGROUND

Buildings, including residences and commercial property, are traditionally equipped with smoke detectors configured to alert an occupant of the building to the presence of a fire. The smoke detectors include elements configured to measure the amount of smoke present in the air entering the detector. The smoke detectors are configured to sound an alarm when the amount of smoke entering the detector exceeds a certain threshold. The alarm signals the occupant to vacate the property. The amount of time available to the occupant to vacate the property after the alarm activates but before the structure burns is referred to as the egress time. In recent years, the egress time has dramatically decreased, due in part to the usage of plastics and more modern, highly combustible materials.

Detection accuracy is also an issue with many smoke detectors. For example, smoke detectors may have difficulty detecting smoldering fires, a fire in which the amount of oxygen or fuel is sufficient to maintain a continuous reaction, but not enough for the fire to grow uncontrolled. In these instances, the hazard to the occupant may be greater as the fire may progress undetected until well after conditions have begun to deteriorate. Accordingly, there is a need for enhanced fire detection methods and systems that improve the fire detection and reduce egress times.

SUMMARY OF THE INVENTION

An illustrative method includes receiving sensor data over time from each node of a plurality of sensory nodes located within a building. The method also includes determining a sensor specific abnormality value for each node of the plurality of sensory nodes. The method further includes determining, a building abnormality value in response to a condition where the sensor specific abnormality value for multiple nodes of the plurality of sensory nodes exceeds a threshold value. The method also includes causing an alarm to be generated based on the building abnormality value.

In an illustrative embodiment, determining the sensor specific abnormality value for each node of the plurality of sensory nodes may include determining a long term average of sensor data over a first time interval, and determining a control limit by adding or subtracting an offset value from the long term average.

An illustrative system includes a computing device. The computing device includes a transceiver, a memory, and a processor. The transceiver is configured to receive sensor data over time from each node of a plurality of sensory nodes. The memory is configured to store sensor data. The processor is operatively coupled to the memory and the transceiver. The processor is configured to determine a sensor specific abnormality value for each node of the plurality of sensory nodes. The processor is also configured to determine, a building abnormality value in response to a condition where the sensor specific abnormality value for multiple nodes of the plurality of sensory nodes exceeds a threshold value. The processor is further configured to transmit an instruction to each sensory node to generate an alarm based on the building abnormality value.

An illustrative non-transitory computer-readable medium has computer readable instructions stored thereon that, upon execution by a processor, cause a computing device to perform operations. The instructions include instructions to receive sensor data from each node of a plurality of sensory nodes. The instructions also include instructions to determine a sensor specific abnormality value for each node of the plurality of sensory nodes. The instructions further include instructions to determine, a building abnormality value in response to a condition where the sensor specific abnormality value for multiple nodes of the plurality of sensory nodes exceeds a threshold value. The instructions further include instructions that cause an alarm to be generated by each one of the plurality of sensory nodes.

Other principal features and advantages will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings.

DETAILED DESCRIPTION

Described herein are systems and methods for enhanced fire detection. An illustrative embodiment of a fire detection system includes smoke detectors configured to measure an amount of smoke obscuration and/or temperature, carbon monoxide and/or other gas detectors, humidity detectors, and detectors configured to monitor the buildup of flammable materials. The detectors may be distributed throughout a building (e.g., in one or more rooms within a building, etc.). Each detector is communicatively coupled to a computing device. Sensor data from each detector may be transmitted across a network to the computing device. The computing device may be configured to continuously receive sensor data in real-time. In an illustrative embodiment, the computing device is configured to identify abnormal sensor data from any one of the detectors. The computing device is configured to calculate a building wide abnormality value based on abnormal sensor data from multiple detectors. The fire detection system is configured to generate an alarm based on the building wide abnormality value.

In an illustrative embodiment, the building wide abnormality value may be used to characterize the fire. For example, the building wide abnormality value may be indicative of a progression of a fire. The building wide abnormality value and abnormal sensor data may be transmitted to a detector, a monitoring unit in an emergency response center, or another network connected device. Among other benefits, the fire detection system may reduce the incidence of false-positive detection and false-negative detection (e.g., incorrectly reporting that a fire is not occurring, when a fire is actually in-progress) that may occur when sensor data from only a single sensor is considered. The building wide abnormality value may also provide an indication of the fire's severity (e.g., its progression through a building, the rate of growth, etc.).

Figure 1:
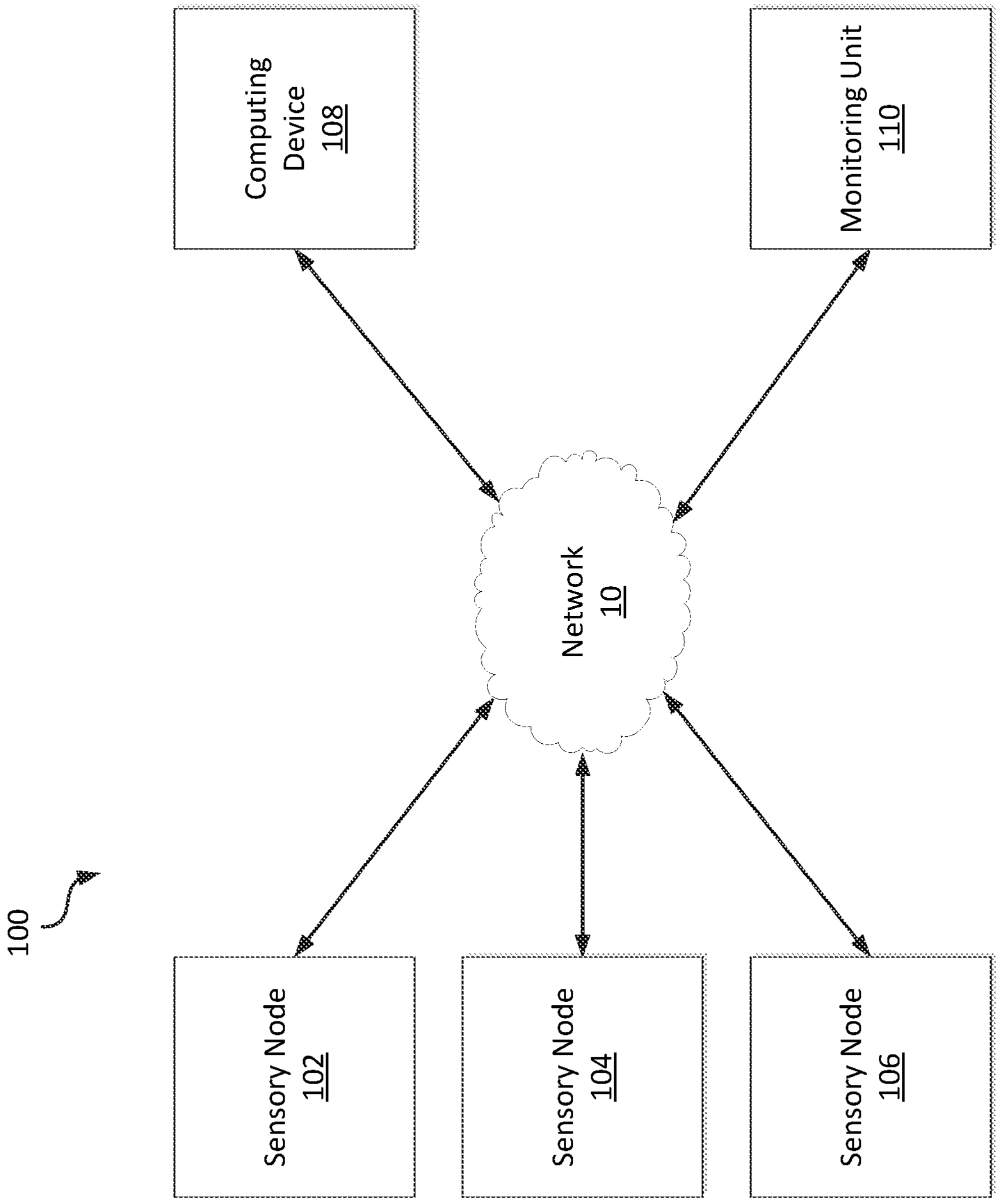
FIG. 1 is a block diagram of a fire detection system in accordance with an illustrative embodiment.

FIG. 1 is a block diagram of a fire detection system 100 in accordance with an illustrative embodiment. In alternative embodiments, the fire detection system 100 may include additional, fewer, and/or different components. The fire detection system 100 includes a plurality of sensory nodes 102, 104, 106. In alternative embodiments, additional or fewer sensory nodes 102, 104, 106 may be included. The fire detection system 100 also includes a computing device 108 and a monitoring unit 110. Alternatively, additional computing devices 108, or additional or fewer monitoring units 110 may be included.

In an illustrative embodiment, the sensory nodes 102, 104, 106 are configured to measure sensor data and transmit a real-time value of sensor data to the computing device 108. The sensory nodes 102, 104, 106 may be distributed throughout a building (e.g., within one or more rooms of a building). The building may be an office building, a commercial space, a store, a factory, or any other building or structure. Each of the sensory nodes 102, 104, 106 may be configured to generate an alarm in response to instructions from the computing device 108 or, under the condition that the real-time value of sensor data is above a mandated level (e.g., a government mandated level, a threshold value based on Underwriters Laboratory (UL) standards, etc.), independently from the computing device 108. The alarm may be a sound that signals an occupant to vacate a structure of a building. An illustrative embodiment of a sensory node 200 is described in more detail with reference to FIG. 2.

A network connected device, shown as computing device 108, may be configured to receive and process data from each of the sensory nodes 102, 104, 106. The computing device 108 may be configured to determine, based on sensor data received from each of the sensory nodes 102, 104, 106 over time, normalized conditions for the sensory node 102, 104, 106. The normalized conditions may be a time-averaged value of the sensor data during a first time interval. The first time interval may be a period of time up to and including a real-time value of sensor data. The computing device 108 may be configured to cause a notification to be generated based on a determination that the real-time value of the sensor data is outside of normalized conditions. The notification may be an alarm, a monitor, or an input in a first layer of a machine learning algorithm. The computing device 108 may be configured to transmit instructions to the sensory nodes 102,104, 106 to take action based on a determination that the notification has been generated for one or more sensory nodes 102, 104, 106. An illustrative embodiment of a computing device 300 is described in more detail with reference to FIG. 3.

A monitoring device, shown as monitoring unit 110, may be configured to receive sensor data from one or more sensory nodes 102, 104, 106 and/or the computing device 108. The monitoring unit 110 may also be configured to receive analytics, derived or processed sensor data, or other metrics from the computing device 108. The monitoring unit 110 may be a computing device in a command station for an emergency response facility (e.g., a 911-call center, a fire department, a police department, etc.), or a monitoring station for a manufacturer of the fire detection system 100. The monitoring unit 110 may be configured to display the data for visual analysis. The monitoring unit 110 may be configured to display the data as a graph, a table, a written summary, or another viewable representation. The data may be used to automatically alert first responders to a fire in the building or to trigger other services within the building (e.g., a sprinkler system, a fire door, etc.). An illustrative embodiment of a monitoring unit 400 is described in more detail with reference to FIG. 4.

In the illustrative embodiment of FIG. 1, each of the sensory nodes 102, 104, 106 is communicatively coupled to the computing device 108 and the monitoring unit 110 through a network 10. The network 10 may include a short a short-range communication network such as a Bluetooth network, a Zigbee network, etc. The network 10 may also include a local area network (LAN), a wide area network (WAN), a telecommunications network, the Internet, a public switched telephone network (PSTN), and/or any other type of communication network known to those of skill in the art. The network 10 may be a distributed intelligent network such that the fire detection system 100 can make decisions based on sensor data from any of the sensory nodes. In an illustrative embodiment, the fire detection system 100 includes a gateway (not shown), which communicates with sensory nodes 102, 104, 106 through a short-range communication network. The gateway may communicate with the computing device 108 or directly with the monitoring unit 110 through a telecommunications network, the Internet, a PSTN, etc. so that, in the event a fire is detected or alerts are triggered from any one of the sensory nodes 102, 104, 106, the monitoring unit 110 (e.g., an emergency response center, etc.) can be notified.

Figure 2:
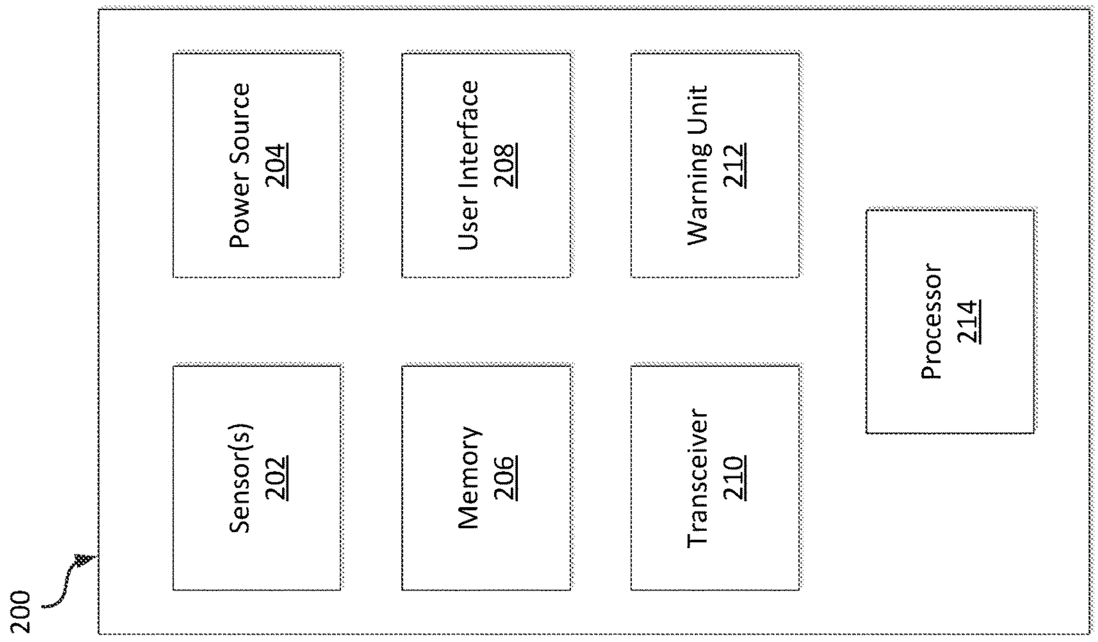
FIG. 2 is a block diagram of a sensory node in accordance with an illustrative embodiment.

FIG. 2 is a block diagram illustrating a sensory node 200 in accordance with an illustrative embodiment. In alternative embodiments, sensory node 200 may include additional, fewer, and/or different components. Sensory node 200 includes a sensor 202, a power source 204, memory 206, a user interface 208, a transceiver 210, a warning unit 212, and a processor 214. The sensor 202 may include a smoke detector, a temperature sensor, a carbon monoxide sensor, a humidity sensor, a flammable materials sensor, a motion sensor, and/or any other type of hazardous condition sensor known to those of skill in the art. In an illustrative embodiment, the sensory node 200 may include a plurality of sensors 202. In an illustrative embodiment, the power source 204 is a battery. Alternatively, the sensory node 200 may be hard-wired to the building such that power is received from a power supply of the building (e.g., a utility grid, a generator, a solar cell, a fuel cell, etc.). In an embodiment where the sensory node 200 is hard-wired, the power source 204 may include a battery for backup power during power outages.

Memory 206 for the sensory node 200 may be configured to store sensor data from sensor 202 over a given period of time. Memory 206 may also be configured to store computer-readable instructions for the sensory node 200. The instructions may be operating instructions that modify data collection parameters for the sensory node 200. For example, the instructions may force the sensory node 200 to modify a sampling rate (e.g., a measurement frequency, etc.), a measurement resolution, or another data collection parameter. Memory 206 may be configured to store a list of data collection parameters and a change rate for each data collection parameter. The change rate may be a maximum rate of change of an individual data collection parameter over time (e.g., a maximum allowable change in temperature over a given period of time, a maximum allowable change in an amount of smoke obscuration over a given period of time, etc.). The instructions may cause the processor 214 to calculate a rate of change of the sensor data by comparing two or more values of sensor data stored in memory 206 or by comparing a real-time value of sensor data with a value of sensor data stored in memory 206. The instructions may cause the processor 214 to crawl through the list of data collection parameters to determine the required change in the data collection parameter corresponding to the rate of change of sensor data and to modify the data collection parameter accordingly.

Memory 206 may be configured to store identification information corresponding to sensory node 200. The identification information can be any indication through which other members of the network (e.g., other sensory nodes 200, the computing device, and the monitoring unit) are able to identify the sensory node 200. The identification information may be global positioning system (GPS) coordinates, a room or floor of a building, or another form of location identification.

The user interface 208 may be used by a system administrator or other user to program and/or test the sensory node 200. The user interface 208 may include one or more controls, a liquid crystal display (LCD) or other display for conveying information, one or more speakers for conveying information, etc. The user interface 208 may also be used to upload location information to the sensory node 200, to test the sensory node 200 to ensure that the sensory node 200 is functional, to adjust a volume level of the sensory node 200, to silence the sensory node 200, etc. The user interface 208 may also be used to alert a user of a problem with sensory node 200 such as low battery power or a malfunction. The user interface 208 can further include a button such that a user can report a fire and activate the response system. The user interface 208 can be, for example, an application on a smart phone or another computing device that is remotely connected to the sensory node 200.

The transceiver 210 may include a transmitter for transmitting information and/or a receiver for receiving information. As an example, the transceiver 210 of the sensory node 200 can transmit a real-time value of sensor data to another network connected device (e.g., the computing device, the monitoring unit, another sensory node, etc.). The transceiver 210 may be configured to transmit the real-time value at different sampling rates depending on the data collection parameters of the sensory node 200. The transceiver 210 may be configured to receive instructions from the computing device or the monitoring unit. For example, the transceiver 210 may be configured to receive instructions that cause the sensory node 200 to generate an alarm to notify an occupant of a potential fire. The transceiver 210 may be configured to receive operating instructions from the computing device for the sensory node 200. The transceiver 210 may be configured to receive a list of data collection parameters and a change rate for each operating parameter.

The transceiver 210 may be configured to transmit information related to the health of the sensory node 200. For example, the transceiver 210 may be configured to transmit end-of-life calculations performed by the processor 214 (e.g., an end-of-life calculation based on total operating time, processor usage 214 statistics, operating temperature, etc.). The transceiver 210 may also be configured to transmit battery voltage levels, tamper alerts, contamination levels and faults, etc.

The warning unit 212 can include a speaker and/or a display for conveying a fire alarm (e.g., an order to leave or evacuate the premises, an alarm to notify an occupant of a potential fire, etc.). The speaker may be used to generate a loud noise or play a voice evacuation message. The display of the warning unit 212 can be used to convey the evacuation message in textual form for deaf individuals or individuals with poor hearing. The warning unit 212 may further include one or more lights to indicate that a fire has been detected or an alarm order has been received from the computing device.

The processor 214 may be operatively coupled to each of the components of sensory node 200, and may be configured to control interaction between the components. For example, the processor 214 may be configured to control the collection, processing, and transmission of sensor data for the sensory node 200. By way of example, the processor 214 may be configured to route sensor data measured by the sensor 202 to memory 206, or to the transceiver 210 for transmission to a network connected device (e.g., the computing device or the monitoring unit).

The processor 214 may be configured to interpret operating instructions from memory 206 and/or operating instructions from the remoting computing device so as to determine and control data collection parameters for the sensory node 200. For example, the processor 214 may be configured to determine, based on two or more real-time values of sensor data, a rate of change of the sensor data. The processor 214 may determine the rate of change by comparing a real-time value of sensor data from the sensor 202 to a previous value of sensor data stored in memory 206. The processor 214 may be configured to access a list of data collection parameters stored in memory 206. The processor 214 may be configured to examine the list of data collection parameters to determine the required change in the data collection parameter corresponding to the rate of change of sensor data. The processor 214 may be configured to modify the data collection parameter accordingly.

If an instruction is received by the sensory node 200 to generate an alarm, the processor 214 may cause warning unit 212 to generate a loud noise or play an evacuation message. The processor 214 may also receive inputs from user interface 208 and take appropriate action. The processor 214 may further be used to process, store, and/or transmit information that identifies the location or position of the sensory node 200. The processor 214 may be coupled to power source 204 and used to detect and indicate a power failure or low battery condition.

The processor 214 may also be configured to perform one or more end-of-life calculations based on operating instructions stored in memory 206. For example, the processor 214 may be configured to access sensor data stored in memory 206 and examine the data for trends in certain data collection parameters (e.g., a number of periods of increased data collection frequency, etc.). The processor 214 may be configured to predict end-of-life condition based on these trends. For example, the processor 214 may estimate an end-of-life condition for a battery by comparing these trends to known operating characteristics of the battery (e.g., empirically derived formulas of battery life vs. usage, etc.).

The components of the sensory node 200 described above should not be considered limiting. Many alternatives are possible without departing from the principles disclosed herein. For example, the sensory node 200 may further include an analog-to-digital converter to transform raw data collected by the sensor 202 into digital data for further processing. The sensory node 200 may further include an enclosure or housing, components for active cooling of electronics contained within the enclosure, etc.

Figure 3:
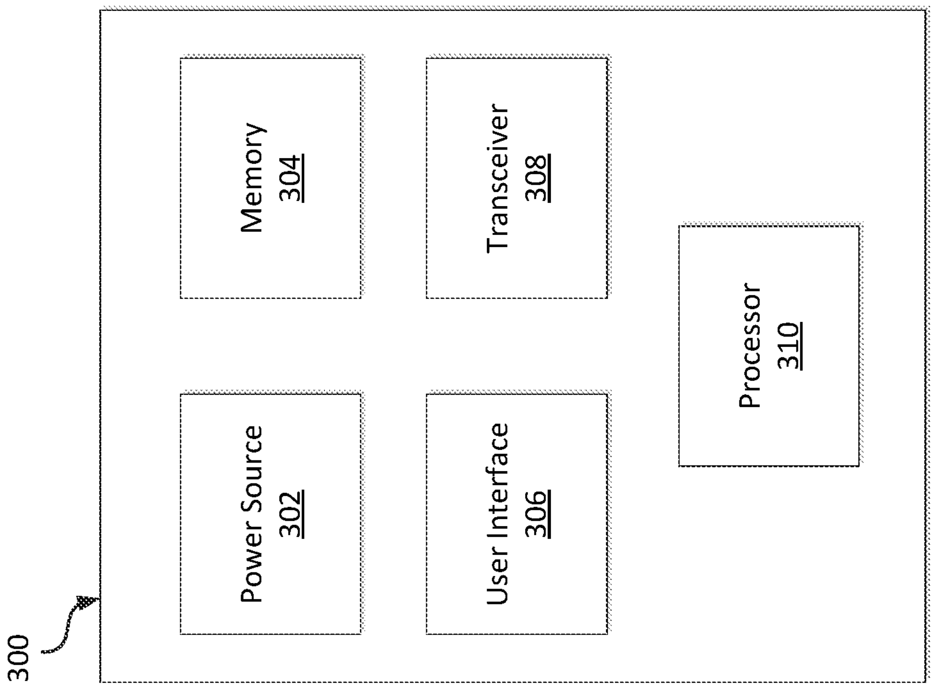
FIG. 3 is a block diagram of a computing device in accordance with an illustrative embodiment.

FIG. 3 is a block diagram illustrating a computing device 300 in accordance with an illustrative embodiment. In alternative embodiments, the computing device 300 may include additional, fewer, and/or different components. The computing device 300 includes a power source 302, memory 304, a user interface 306, a transceiver 308, and a processor 312. In an illustrative embodiment, the power source 302 is the same or similar to power source 210 described with reference to FIG. 2. Similarly, the user interface 306 may be the same or similar to user interface 208 described with reference to FIG. 2.

Memory 304 for the computing device 300 may be configured to store sensor data from the plurality of sensory nodes. Memory 304 may also be configured to store processing instructions for sensor data received from each sensory node. In an illustrative embodiment, the processing instructions form part of a machine learning algorithm. The machine learning algorithm may be a mathematical statistical computer model that processes inputs from each one of the plurality of sensory nodes to determine whether a fire is occurring. The machine learning algorithm may be used to determine an out of bounds condition (e.g., when a real-time value of sensor data from a sensory node is outside of normalized conditions). The machine learning algorithm may be used to determine a sensor specific abnormality value for each node based on real-time sensor data. The machine learning algorithm may aggregate (e.g., bundle) sensor data from each one of the plurality of sensory nodes in memory 304 for further processing.

The processing instructions stored in memory 304 may further include instructions that cause an alarm to be generated by one or more sensory nodes. The instructions may be accessed and transmitted to the sensory node when a fire is detected. Memory 304 may also include computer-readable instructions (e.g., operating instructions) that can be transmitted to the sensory node.

The transceiver 308, which can be similar to the transceiver 210 described with reference to FIG. 2, may be configured to receive information from sensory nodes and other network connected devices. The transceiver 210 may also be configured to transmit operating instructions to each sensory node. The processor 312 may be operatively coupled to each of the components of computing device 300, and may be configured to control the interaction between the components. For example, the processor 312 may access and execute processing instructions for the machine learning algorithm stored in memory 304. In an illustrative embodiment, the processing instructions include determining normalized conditions for the plurality of sensory nodes, detecting out-of-bounds conditions for each sensory node, and determining, based on the out of bounds conditions from each of the plurality of sensory nodes, whether a fire is occurring. The processor 312 may further be configured to generate an application from which a user may access sensor data, derived parameters, and processed analytics. The details of the general depiction of these processes will be described with reference to FIGS. 4-16.

In an illustrative embodiment, the computing device 300 is a network server. The network server may be part of Amazon Web Services (AWS), an Azure cloud-based server, or another cloud computing service or platform. An application (e.g., software) may be stored on the computing device 300. The application may include processing instructions for sensor data, processing instructions for the machine learning algorithm used to detect a fire, and/or other data processing algorithms. The network server may be accessed using any network connected device. For example, the network server may be accessed from an internet connected desktop computer, or wireless device such as a laptop, tablet, or cell-phone. In an illustrative embodiment, the computing device 300 is configured to receive application updates from a manufacturer of the fire detection system. The application updates may include updates to the machine learning algorithm that improve the predictive capabilities of the fire detection system, or operating instructions for one or more sensory nodes. The computing device 300 may form part of a multitenant architecture, which allows a single version of the application, with a single configuration, to be used for all customers. Among other benefits, implementing the computing device 300 allows for instantaneous deployment of application and software improvements, so that customers continuously receive new features, capabilities, and updates with zero effort.

Figure 4:
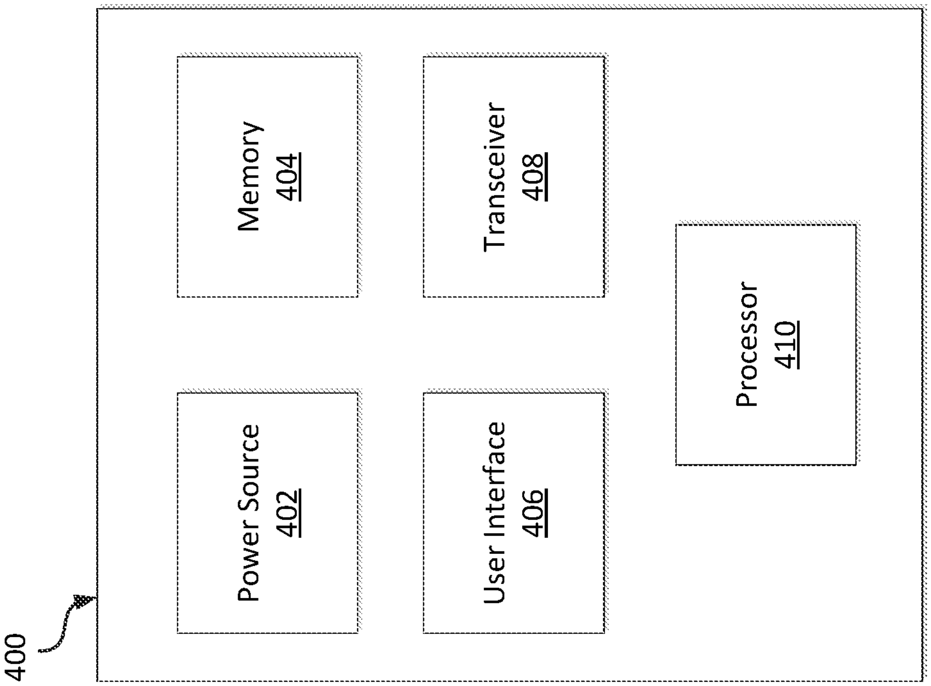
FIG. 4 is a block diagram of a monitoring unit in accordance with an illustrative embodiment.

FIG. 4 is a block diagram illustrating a monitoring unit 400 in accordance with an illustrative embodiment. In alternative embodiments, the computing device 300 may include additional, fewer, and/or different components. The monitoring unit 400 includes a power source 402, memory 404, a user interface 406, a transceiver 408, and a processor 410. In an illustrative embodiment, the power source 402 is the same or similar to power source 210 described with reference to FIG. 2. Similarly, the user interface 306 may be the same or similar to user interface 208 described with reference to FIG. 2. The user interface may be configured to display sensor data from the sensory nodes or computing device. The user interface may also be configured to display processed parameters and analytics from the computing device.

In an illustrative embodiment, the transceiver 408 is configured to receive sensor data, processed parameters and analytics from the computing device. The processor 410 may be operatively coupled to each of the components of the monitoring unit 400, and may be configured to control the interaction between the components. For example, the processor 312 may be configured to interpret instructions from the computing device to generate a notification alerting emergency responders of a fire.

Figure 5:
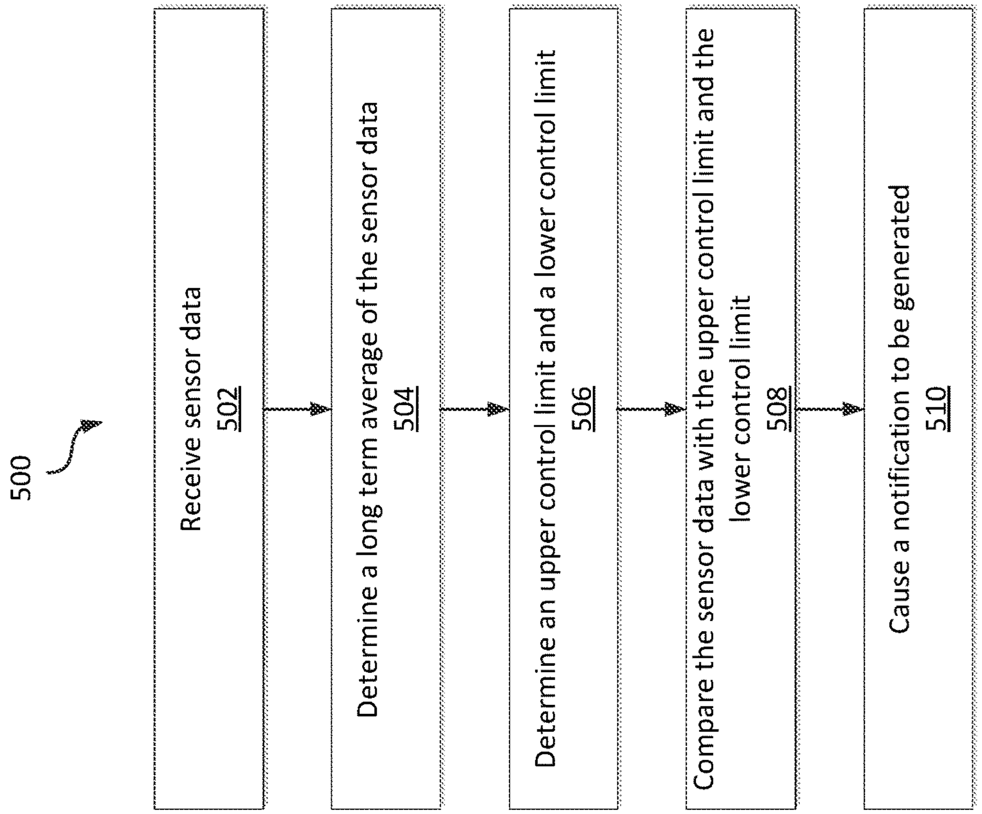
FIG. 5 is a flow diagram of a method monitoring and processing sensor data from a sensory node in accordance with an illustrative embodiment.

FIG. 5 is a flow diagram of a method 500 for monitoring and processing sensor data from each sensory node in accordance with an illustrative embodiment. The operations described herein may be implemented as part of a single layer of a machine learning algorithm used to predict a fire or other abnormality based on aggregated sensor data from each node of the plurality of sensory nodes. In alternative embodiments, additional, fewer, and/or different operations may be performed. Also, the use of a flow diagram and arrows is not meant to be limiting with respect to the order or flow of operations. For example, in an illustrative embodiment, two or more of the operations of the method 500 may be performed simultaneously.

In operation 502, sensor data from each sensory node is received by the computing device. The sensory node may be a smoke detector, a CO detector and/or other gas detector, a humidity detector, a flammable material detector, a motion detector, etc., or combination thereof. In an embodiment including a smoke detector, the sensor data may be an amount of smoke obscuration (e.g., an amount of smoke, a percent obscuration per unit length, etc.) or temperature (e.g., a temperature of air entering the detector). In an embodiment including a CO detector or other gas detector, the sensor data may be a level, in parts per million, of carbon monoxide or other gas in the vicinity of the detector. In an embodiment including a humidity detector, the sensor data may be a relative humidity of air entering the sensor. In an embodiment including a flammable material detector, the sensor data may be a thickness of grease in a kitchen appliance. The sensor data may also be a sensor metric for a single sensory node that includes two or more measurements. Alternatively, a single sensory node with multiple sensors may report two separate sets of sensor data.

The sensor data may be received as a real-time value of sensor data. The real-time value may be a most recent value measured by the sensory node. The real-time value may be received by the computing device from the sensory node or from a gateway communicatively coupled to the sensory node. The real-time value may be measured by the sensory nodes and received by the computing device at a first reporting frequency (e.g., once every 180 s, once every 4 s, etc.).

In the illustrative embodiment of FIG. 5, the computing device stores the sensor data over time so as to determine a normalized condition for the sensory node. The computing device determines the normalized condition as a bounded, long term average of the sensor data. In other embodiments, normalized conditions may be determined by some other statistical parameter.

In operation 504, the computing device determines a long term average of the sensor data. In an embodiment, the processor for the computing device accesses sensor data (e.g., raw measurement data or sensor metrics) taken over a first time interval from memory. The processor then averages this data to determine the long term average. In an illustrative embodiment, the first time interval spans a period of time up to and including the real-time value of sensor data. Accordingly, the long term average is continuously changing with time. For example, the long term average may span a time period of 30-35 days so as to capture "normal" fluctuations in areas surrounding the sensory nodes (e.g., normal fluctuations of temperature and relevant humidity within the building).

In addition to the long term average, the computing device may be configured to track and store other information of statistical relevance. For example, the sensor data may include timestamps (e.g., time of day). The timestamps may be used to capture "normal" fluctuations in sensor data associated with different periods of the day. This information may be utilized by the computing device to establish different long term averages relevant for different periods of the day (e.g., a long term average associated with sensor data received at night, etc.) for different sensory nodes. Additionally, the sensor data may include occupancy information, cooking times, etc., all of which can be used to improve the predictive capabilities of the fire detection system. For example, sensor data received during a cooking time may include higher values of "normal" fluctuations of smoke obscuration due to particulate and water vapor generated during a cooking activity. By recognizing and identifying these periods, the fire detection system (e.g., the machine learning algorithm) can reduce false positives and/or scenarios where high levels of smoke obscuration, temperature, etc. are actually within bounds established by regular occupant activities.

In operation 506, an upper control limit and a lower control limit are determined. In an illustrative embodiment, the processor of the computing device determines the control limits by adding or subtracting an offset value from the long term average. The offset value may be a variety of different statistical parameters (e.g., variance, standard deviation, etc.). For example, the processor may calculate the standard deviation of a normal distribution that is fit to sensor data over the first time interval. The processor may add a fixed number of standard deviations (e.g., three standard deviations) to the long term average to determine the upper control limit. The processor may subtract a fixed number of standard deviations to the long term average to determine the lower control limit. In alternative embodiments, a different offset value may be empirically determined from sensor data during the first time interval (e.g., a standard deviation based on an exponential distribution that is fit to sensor data over the first time interval).

Similar to the long term average, the offset value used to determine the upper and lower control limits will change with time, and more particularly, at each point sensor data (e.g., a real-time value of sensor data) is received from a sensory node. In an illustrative embodiment, the fire detection system causes a notification to be generated based on a determination that the real-time value of the sensor data is greater than the upper control limit or lower than the lower control limit. In operation 508, the real-time value of sensor data is compared with upper and lower control limits, as well as other measured values, to determine if an out-of-bounds condition has just been measured. Again, this operation may be performed by the processor of the computing device. The processor, upon receiving the real-time value of sensor data, is configured to access the control limits stored in memory. If the real-time value of sensor data is within the bounds established by the control limits, the processor adds the real-time value to other sensor data from the first time interval, and recalculates normalized conditions (e.g., the long term average and control limits). Conversely, if the real-time value of sensor data is out of bounds (e.g., greater than the real-time upper control limit or less than the real-time lower control limit), the computing device may cause a notification to be generated (operation 510). The notification may be an alert on a user device that notifies an occupant of a potential fire. Alternatively, the notification may be a condition that causes the processor to take further action (e.g., to perform additional calculations on the abnormal sensor data, etc.)

Figure 6:
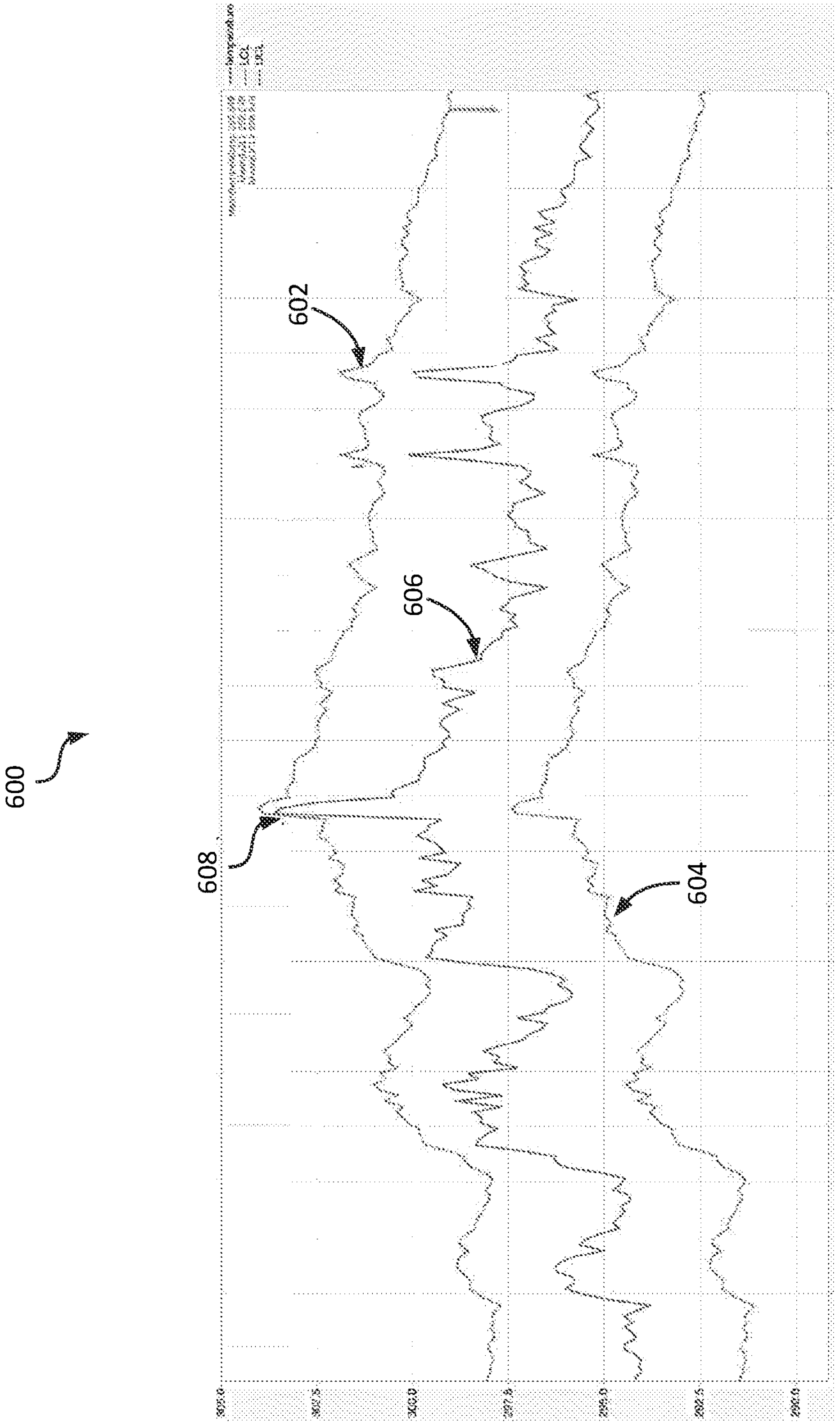
FIG. 6 is a graph of a real-time value of sensor data, an upper control limit, and a lower control limit in accordance with an illustrative embodiment.

FIG. 6 shows a graphical representation of the data monitoring and comparison operation (operations 502-508 of FIG. 5) in accordance with an illustrative embodiment. The upper curve 602 shows the real-time upper control limit. The lower curve 604 shows the real-time lower control limit. The central curve 604, in between curves 602 and 604, represents the real-time value of sensor data measured by one of the sensory nodes. As shown in FIG. 6, the control limits vary with time, based on normal fluctuations of the real-time sensor data. An out of bounds condition, shown as condition 608, results when a real-time value of the sensor data is greater than the real-time upper control limit (curve 602).

In an illustrative embodiment, if the real-time value of sensor data is out of bounds, the processor will perform a verification step before generating the alarm. For example, the processor may wait for the next real-time value of sensor data to verify that the condition is still out of bounds. In other embodiments, the processor of the computing device may require more than two out-of-bounds conditions, in series, to cause an alarm to be generated. Among other advantages, this approach may reduce the occurrence of false-positives due to normal sensor abnormalities, contamination, etc.

In an illustrative embodiment, the fire detection system utilizes a method of evaluating a most recent value (e.g., a real-time value) of sensor data similar to or the same as described in U.S. Pat. No. 9,679,255, granted Jun. 13, 2017 (hereinafter the '255 Patent), the disclosure of which is incorporated herein by reference in its entirety.

In operation 510 of FIG. 5, the fire detection system causes a notification to be generated. The notification may be an alarm, an alert, or a trigger in a first layer of the machine learning algorithm. The notification may result in a modification of the behavior of the machine learning algorithm, which can, advantageously, reduce the detection time. For example, in the event an alarm for a single sensory node is generated, the machine learning algorithm may readjust the control limits for other sensory nodes (e.g., tighten the control limits, reduce the offset value, etc.). Alternatively, or in combination, the machine learning algorithm may change the notification requirements for other sensory nodes such that only a single out-of-bounds condition triggers a second notification (e.g., as opposed to two or more out-of-bounds conditions). In an illustrative embodiment, the computing device may transmit an instruction, based on the notification, to one or more sensory nodes to generate an alarm and thereby notify an occupant of a fire in-progress. In an illustrative embodiment, the notification may be transmitted from the computing device to a monitoring unit (e.g., a network connected device such as a tablet, cell-phone, laptop computer, etc.). The notification could alert a monitoring center such as a 911-call center, an emergency response center, etc. to take action to address the fire. The notification could be displayed on a dashboard (e.g., main page, etc.) of a mobile or web application generated by the processor of the computing device or another network connected device. The dashboard may be accessible through a mobile application or a web browser. In an illustrative embodiment, the notification could be presented as a warning message on the dashboard.

Figure 7:
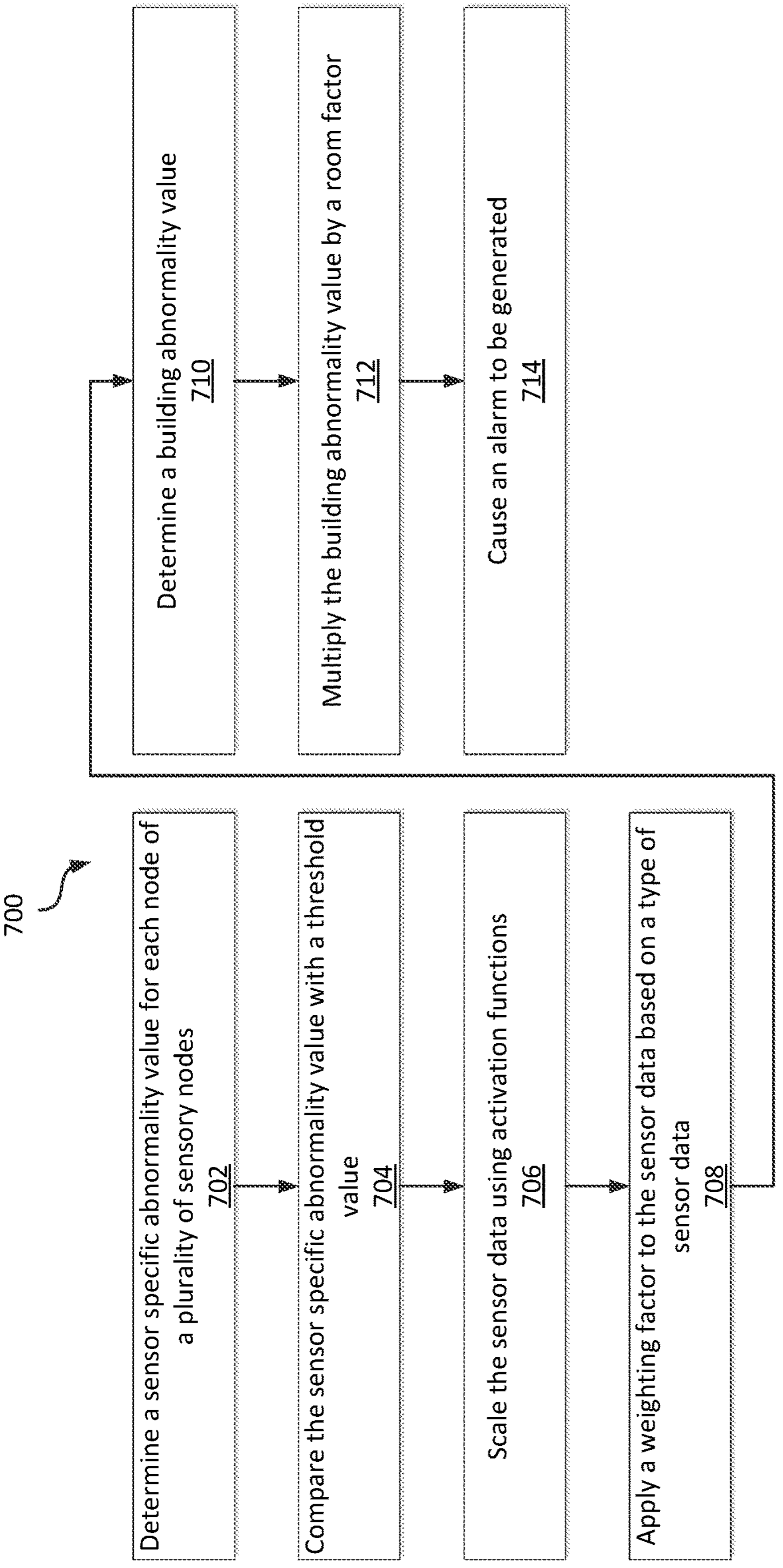
FIG. 7 is a flow diagram of a method of processing sensor data multiple nodes of a plurality of sensory nodes in accordance with an illustrative embodiment.

FIG. 7 shows a method 700 of processing sensor data from multiple nodes of a plurality of sensory nodes. In operation 702, the fire detection system determines a measurement specific abnormality value for each node of the plurality of sensory nodes. The plurality of sensory nodes may include all or fewer than all of the sensory nodes in a building or structure. In an illustrative embodiment, the sensor specific abnormality value is a metric that may be used to assess whether sensor data (e.g., sensor data from a single sensor) from each sensory node is outside of normalized conditions. The sensor specific abnormality value for each node may be a function of normalized conditions. The sensor specific abnormality value may be a function of room occupancy. For example, the specific abnormality value may be calculated by scaling sensor data by an abnormality multiplier determined based on sensor data from a motion sensor. Sensor data from a motion sensor can also be used to compare usual occupancy levels in the building to current occupancy levels to improve the predictive method. Among other advantages, using an abnormality multiplier would help prioritize sensor data from rooms where there are no ongoing occupant activities (e.g., activities that could contribute to false-positive detection, etc.).

The sensor specific abnormality value for each node may be a unit-less number determined by normalizing a real-time value of sensor data or a time averaged-value of sensor data. For example, the processor of the computing device may be configured to determine a long term average of sensor data over a first time interval and a control limit based on the long term average. The processor may be configured to calculate a difference between the control limit and the long term average. The processor may be configured to divide (e.g., normalize) a real-time value of the sensor data or a time-averaged value of sensor data by the difference between the control limit and the long term average. With reference to the '255 Patent, the processor may be configured to divide a real-time value, a mid-term moving average, a long term moving average, or a combination thereof, by the difference between the control limit and the long term average.

In operation 704, the sensor specific abnormality value for each type of sensor data is compared with a threshold value. In an illustrative embodiment, a Boolean operation is performed by the processor of the computing device to determine whether the sensor specific abnormality value exceeds a threshold value. By way of example, in one implementation the sensor specific abnormality value may be normalized based on a long term average of sensor data over a first time interval, or normalized based on a difference between the long term average and a control limit that is determined based on the long term average. In such an implementation, the processor of the computing device may check to see if the sensor specific abnormality value is greater than unity (e.g., is greater than the control limit, is outside of normalized conditions, etc.). In a condition where the sensor specific abnormality value for multiple nodes of the plurality of sensory nodes (e.g., sensor data from a single sensor) exceeds a threshold value, further processing operations may be performed.

In an illustrative embodiment, abnormal sensor data may trigger the calculation of a building abnormality value. In an illustrative embodiment, the building abnormality value is a metric that provides valuable insight into the entire fire evolution process, providing an indication of a fire's progression (e.g., the stage of progression including incipient, growth, flashover, developed, and decay). In an illustrative embodiment, the building abnormality value is determined based only on sensor data from a select number of sensory nodes. Specifically, the building abnormality value is calculated using sensor data from only the sensors that are reporting abnormal sensor data (e.g., those sensors with sensor data having a sensor specific abnormality value that exceeds a threshold value). Among other benefits, this approach reduces the number of inputs to those which are most relevant for fire prediction. The scaling and preprocessing operations also provide an extra layer of protection against both false-positive detection and false-negative detection (e.g., incorrectly reporting that a fire is not occurring, when a fire is actually in-progress).

In an illustrative embodiment, operations 706-710 are used to determine a building abnormality value for the fire detection system. For example, operations 706-710 may be used to scale and filter sensor data. In operation 706, the sensor data is scaled using an activation function. The activation function may be one of a variety of different statistical functions and/or an empirically derived function that improve the predictive method. In an illustrative embodiment, the activation function is a cumulative distribution function determined based on sensor data collected during a first time interval. The cumulative distribution function may be utilized to determine a confidence interval (e.g., a probability) that a real-time value of sensor data is within a normalized range (e.g., the probability that the real-time value of sensor data is less than or equal to any value within a normalized distribution fit to sensor data taken during the first time interval). The sensor data may be scaled by the cumulative distribution function (e.g., multiplied or otherwise combined with) to assign a greater rank (e.g., priority, etc.) to sensors reporting the largest deviation from normalized conditions.

In operation 708, a weighting factor is applied to the sensor data based on a type of the sensor data. The weighting factor may be applied to the sensor data by multiplication or another mathematical operation. There may be several different types of sensor data. The type may be one of an amount of smoke obscuration, a temperature, an amount of a gas, a humidity, and an amount of a flammable material (e.g., a thickness or a height of grease in a cooking appliance). In an illustrative embodiment, the weighting factor is a scaling metric within a range between approximately 0 and 1. Larger weighting factors may be applied to the types of sensor data having the largest relative sensitivity to a fire. For example, the types of sensor data with the largest weighting factor may include an amount of smoke obscuration and an amount of CO, both of which may change more rapidly during the initial formation of a fire, as compared with other types of sensor data such as temperature and humidity.

In other embodiments, more or fewer scaling operations may be performed. Operations 706 and 708, together, determine a neural input to the machine learning algorithm for each of the multiple sensory nodes (e.g., for each sensory node reporting sensor data having a sensor specific abnormality value that exceeds a threshold value). The neural inputs, when aggregated, can be used to develop a more accurate prediction of a fire and its progression.

In operation 710, a building abnormality value is determined. In an illustrative embodiment, the building abnormality value is determined by combining neural inputs generated from each set of sensor data (e.g., by addition, multiplication, or another mathematical operation). In some embodiments, the neural inputs may be scaled by the measurement range of each sensor in advance of determining the building abnormality value. For example, a neural input from a sensor reporting an amount of smoke obscuration may be normalized by the maximum measurement range of the sensor. In other embodiments, the neural inputs may be normalized by a difference between the control limit and the long term average of the sensor data.

In operation 712, the building abnormality value is scaled by (e.g., multiplied by) a room factor. In alternative embodiments, more or fewer processing operations may be performed to scale the building abnormality value. In an illustrative embodiment, the room factor is determined based on a number of rooms that include at least one sensor reporting abnormal sensor data (e.g., a number of rooms including a sensory node reporting sensor data having a sensor specific abnormality value that exceeds a threshold value, a number of rooms that includes at least one sensor reporting sensor data that differs substantially from normalized conditions, etc.). In some embodiments, the room factor may be a square root of the number of rooms. In other embodiments, the room factor may be a different function of the number of rooms. Among other benefits, the room factor may help to provide a more accurate indication of the progression of the fire throughout a building. In some embodiments, the building abnormality may be scaled by an abnormality multiplier that is determined based on occupancy levels within the building (e.g., by sensor data from one or more motion sensors, etc.). Among other benefits, incorporating a scaling factor related to building occupancy helps to reduce false-positives related to occupant related activities (e.g., cooking in a kitchen, taking a shower, etc.).

The building abnormality value provides a metric that a user may use to assess the fire (or the potential that a fire is occurring). In an illustrative embodiment, the building abnormality value is a fire severity indicative of a progression of the fire and/or the overall size of the fire (e.g., the fraction of a building affected by the fire, etc.). The fire severity may be a unit-less number that continues to increase (e.g., without bound) as the size and damage from the fire, as reported by multiple sensory nodes, increases.

Among other benefits, the building abnormality value may be utilized to reduce the incidence of false-positive detection and false-negative detection. For example, the computing device may receive sensor data from a sensory node indicating an increasing amount of smoke obscuration. In response to the abnormal sensor data, the processor for the computing device may calculate a building abnormality value. The building abnormality value may also account for changes in the CO level from a detector located in the vicinity of the smoke detector. A rising CO level, when aggregated with a rising amount of smoke obscuration, is a strong indicator that something is really burning. In the event the CO readings are unchanged after a period of time, the building abnormality value may be reduced. Such measurements could indicate that the raising levels of smoke obscuration may be due to a cooking event or steam from a shower. The building abnormality value may also account for the location of the detector (e.g., is the detector in a bathroom or kitchen where the likelihood of false-positives or false-negatives is greater, etc.). The building abnormality value may be recalculated by the processor whenever a real-time value of sensor data is received by the computing device.

Similar to the CO levels, humidity measurements also provide a valuable metric when calculating the building abnormality value. For example, the computing device may receive sensor data from one of the sensory nodes indicating that an amount of smoke obscuration is increasing. At the same time, the computing device may receive sensor data indicating that a humidity level (e.g., a relative humidity) is decreasing, which further confirms the possibility that a fire is occurring. Accordingly, the building abnormality value would increase to account for the agreement in sensor data between detectors. The sensor data from both detectors, when combined, presents a much more reliable indication of the likelihood of a fire.

In an illustrative embodiment, the building abnormality value may be used to determine a fire probability. The fire probability may be presented as a number between 0 and 100 or 0 and 1 that increases as the prediction confidence interval of a fire in a building increases. The fire probability may be determined using a logistic function that accounts for the growth rate of the building abnormality value.

In operation 714, an alarm or other form of alert may be generated based on the building abnormality value. For example, a first level of the building abnormality value may cause a notification to be sent to an occupant of the building. Similar to the notifications described in detail with reference to operation 510 in FIG. 5, the notification may be accessed by a user through a dashboard in a mobile device or web browser. The occupant may access the dashboard to review the notification and other derived metrics such as the building abnormality value. The dashboard may include links that, when selected by a user, generate a request for emergency services. A second level of the building abnormality may cause a second notification to be sent to the occupant, confirming the likelihood of a fire or another event. A third level of the building abnormality value may cause a notification to be sent to both the occupant of the building and/or a manufacturer of the fire detection system. At any one of the first, second, and third levels, the fire detection system may automatically generate a request for emergency services (e.g., may cause a request to dispatch emergency services automatically, independent from any action taken by the occupant).

In some embodiments, the building abnormality value and other derived metrics may be stored in a smart cache of the computing device. The smart cache may be configured to control the distribution of derived metrics. For example, the smart cache may be configured to distribute the derived metrics based on whether the building abnormality exceeds one of the first, second, and third levels. In an illustrative embodiment, derived metrics, including the sensor specific abnormality value and the building abnormality value, may be used to establish measurement and reporting parameters for the sensory nodes.

Figure 8:
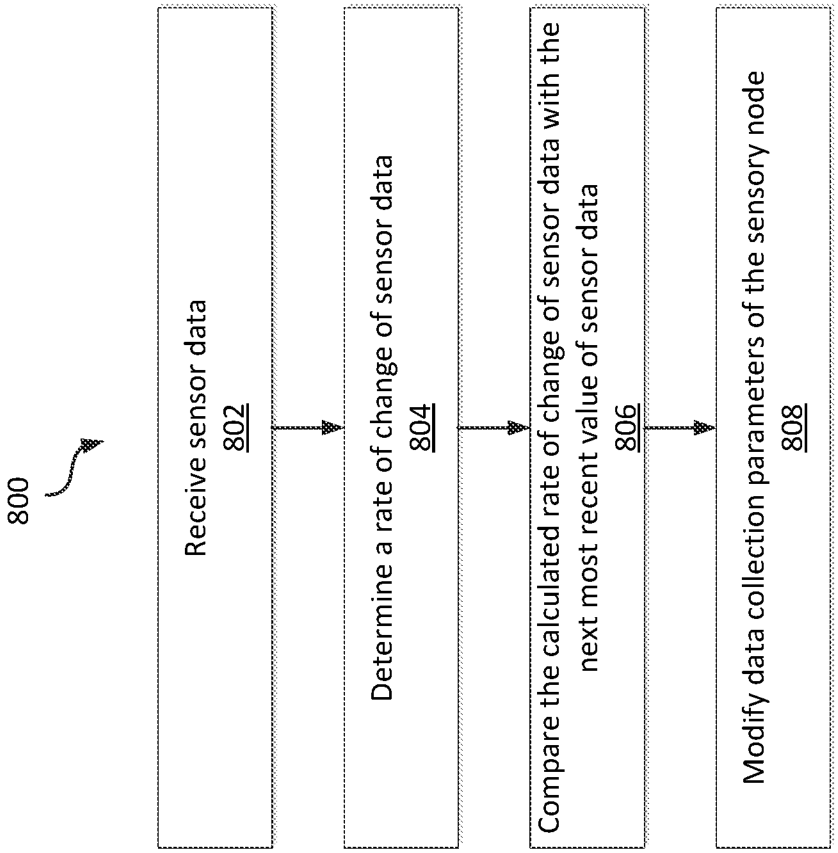
FIG. 8 is a flow diagram of a method of modifying data collection parameters for a fire detection system in accordance with an illustrative embodiment.

FIG. 8 shows a method 800 of modifying data collection parameters for the fire detection system in accordance with an illustrative embodiment. In operation 802, each sensory node is configured to report sensor data at a first reporting frequency during periods of time when no fire is detected (e.g., under normalized conditions as determined by the machine learning algorithm). In operation 804, a rate of change of sensory data is calculated. A processor of the fire detection system may be configured to determine a rate of change of the sensor data by comparing the real-time value of sensor data with the next most recent value of sensor data stored in memory. In operation 806, the fire detection system compares the calculated rate of change with a threshold rate of change. In operation 808, the fire detection system increases the reporting frequency of the sensory node, from the first reporting frequency to a second reporting frequency, based on a determination that the rate of change of sensor data is greater than the threshold rate of change. In an illustrative embodiment the reporting frequency is determined at the sensor level, by examining a list of data collection parameters in memory, and selecting a reporting frequency that aligns with the threshold (or calculated) rate of change. In other embodiments, the determination of the proper reporting frequency is determined by the computing device, based on sensor data received from each sensory node. In the event the reporting frequency needs to be modified, instructions are transmitted from the computing device to the sensory node. These instructions, once executed by the processor of the sensory node, modify the sensor measurement frequency and reporting frequency.

Other data collection parameters, in addition to the reporting frequency, may also be modified based on the event grade data. For example, the measurement resolution (e.g., the number of discrete data points that may be measured within a range of the sensor) from any of the sensory nodes may be adjusted in response to the derived metrics. In addition, the measurement resolution or other data collection parameter may be determined based on whether abnormal sensor data has been reported by the sensory node (operation 510 in FIG. 5). Among other benefits, using a higher measurement resolution before the notification is generated allows the sensor data to more accurately capture small fluctuations that may be indicative of the initial propagation of a fire. In contrast, using a lower resolution after the notification is generated allows the sensor data to continue indicating the fire's severity as the fire evolves beyond the alarm.

EXAMPLE

Figure 9:
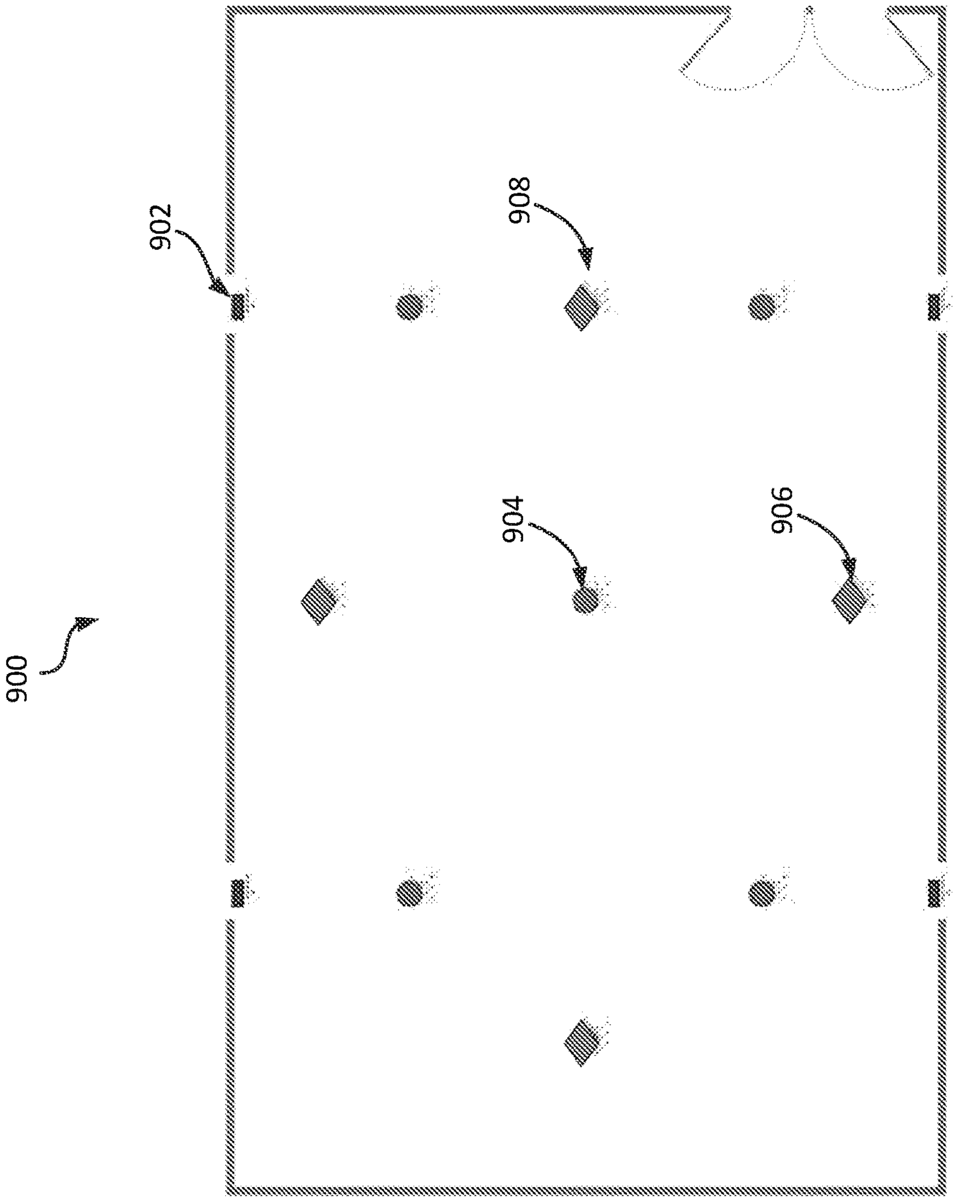
FIG. 9 is a schematic showing the position of sensory nodes in a test setting in accordance with an illustrative embodiment.

FIGS. 9-18 provide setup information and results from an actual test of a fire detection system. The Figures illustrate benefits of some aspects of the fire detection system. FIG. 9 shows a test facility, shown as room 900. The test facility includes a plurality of sensory nodes 902, 904, 906. Among these are four CO detectors 902 positioned along the walls of the room 900 (e.g., Ei Electronics device model number EiA207W), five smoke detectors 704 distributed along a length of the room 900 (e.g., Ei Electronics device model number EiA660W), and four temperature and relative humidity (RH) data loggers 906 distributed in between and around the smoke detectors (e.g., OneEvent device model number OET-MX2HT-433). A simulated ignition source 908 for a fire is disposed proximate to a pair of smoke detectors 904 and a single temperature and RH data logger 906 at one end of the room 900. All sensor data collected during the test was collected by a remote gateway (e.g., OneEvent device model number NOV-GW2G-433). Sensor data was transmitted from the gateway through a secure cellular connection to a computing device. Sensor data was stored within a perpetual non-SQL database warehouse on the computing device, from which the sensor data could be accessed for further analysis.

Figure 10:
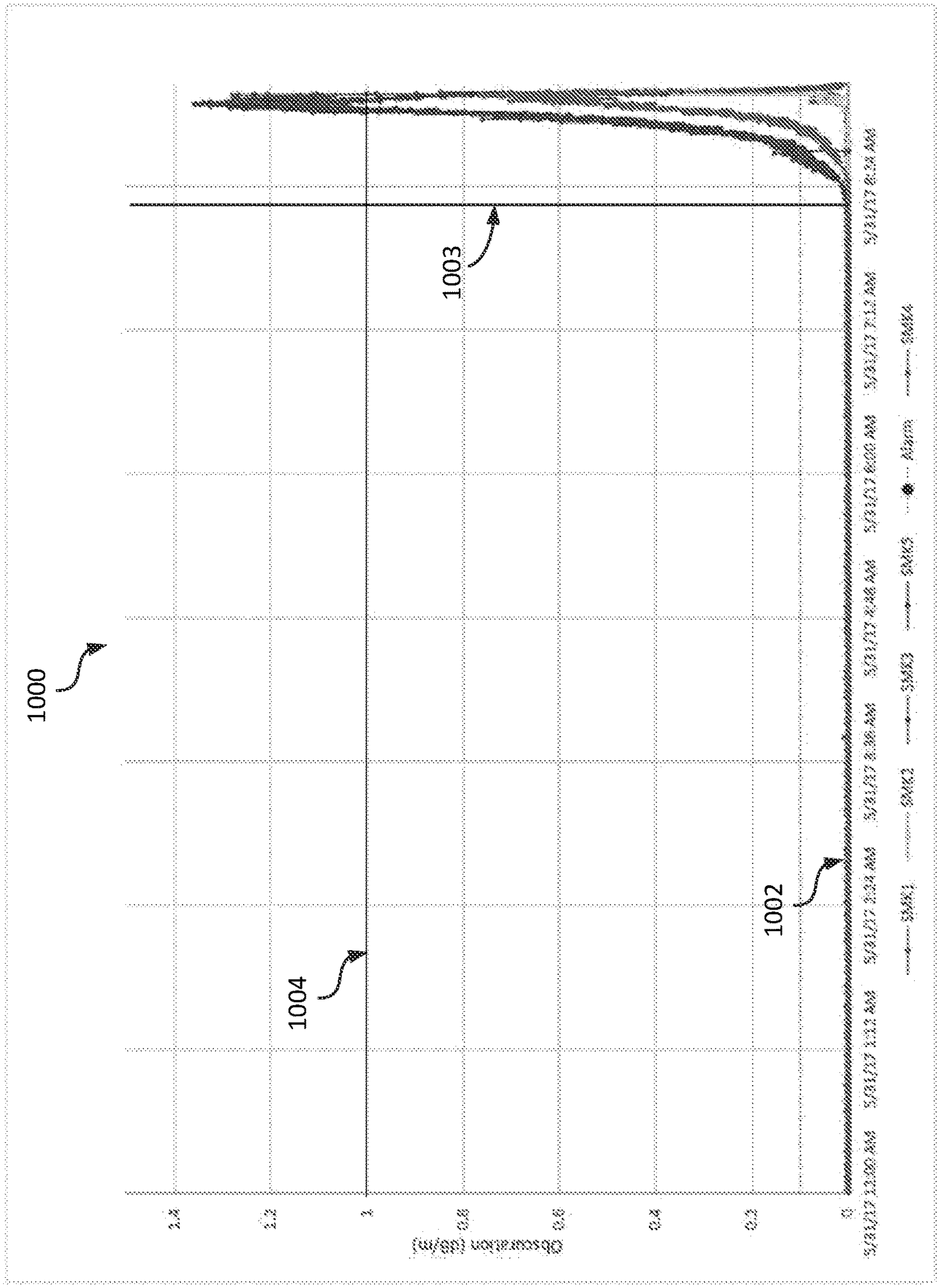
FIGS. 10-18 are plots showing sensor data as a function of time during an actual test in the test setting of FIG. 9 in accordance with an illustrative embodiment.
Figure 11:
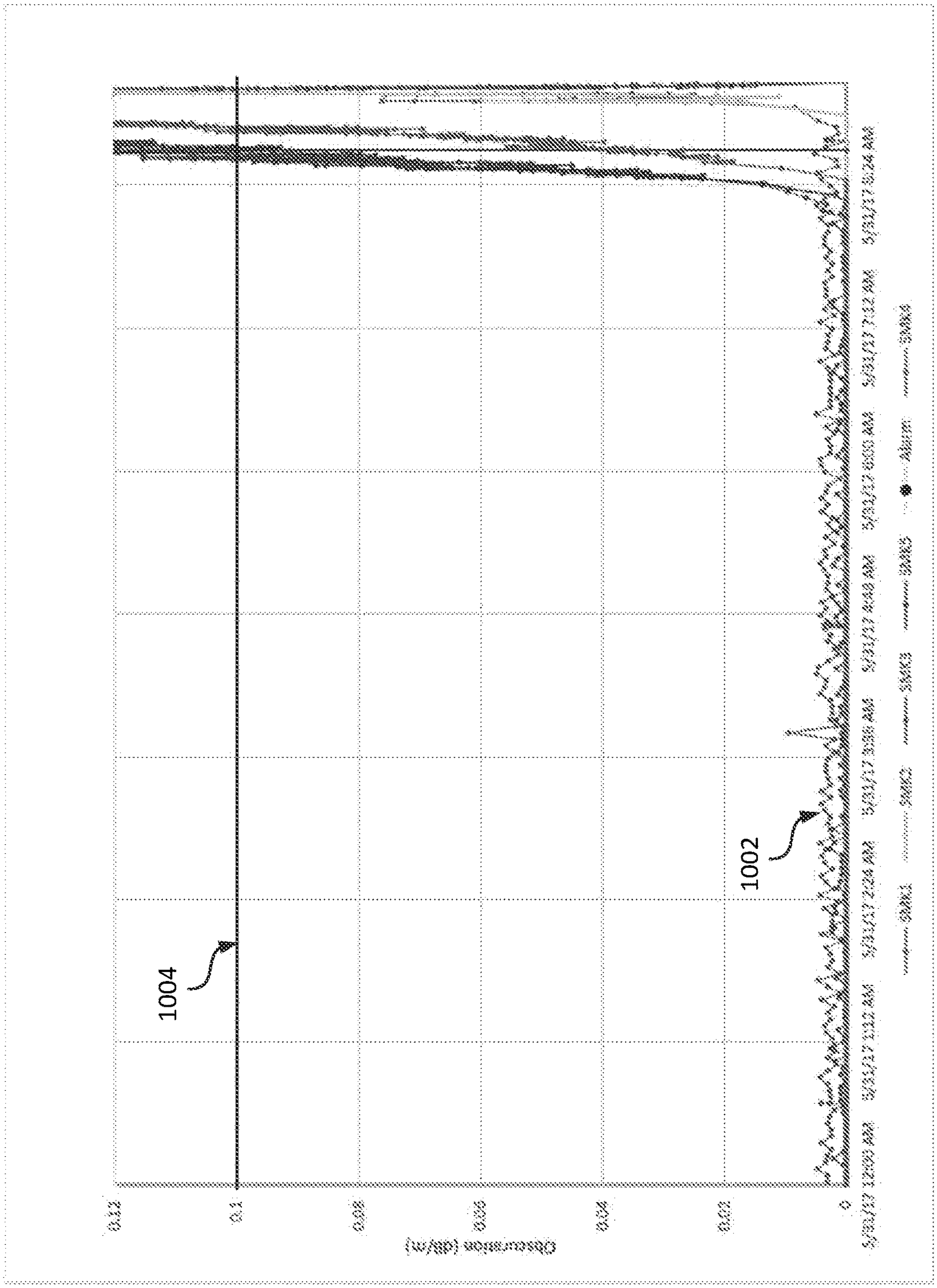

FIG. 10 shows a plot 1000 of sensor data from each of the smoke detectors. Lines 1002 show smoke obscuration measured by each of the smoke detectors over a period of approximately 9 hours beginning at 12 am and ending at approximately 9:08 pm. The ignition source was activated at approximately 8:04 am, as indicated by vertical line 1003. The horizontal line 1004 identifies a smoke obscuration of 0.1 dB/m, the level at which an alarm on the smoke detectors was configured to activate. As shown in FIG. 10, the fire detection system was provided a period of approximately 8 hours to determine normalized conditions. FIG. 11 highlights sensor data (e.g., obscuration levels) below approximately 0.1 dB/m. During the pre-test period, normalized fluctuations in smoke obscuration were measured at or below 0.005 dB/m. The difference between the normalized obscuration levels and the threshold value is significant, indicating the potential of the fire detection system to identify the fire well in advance of a traditional smoke detector.

Figure 12:
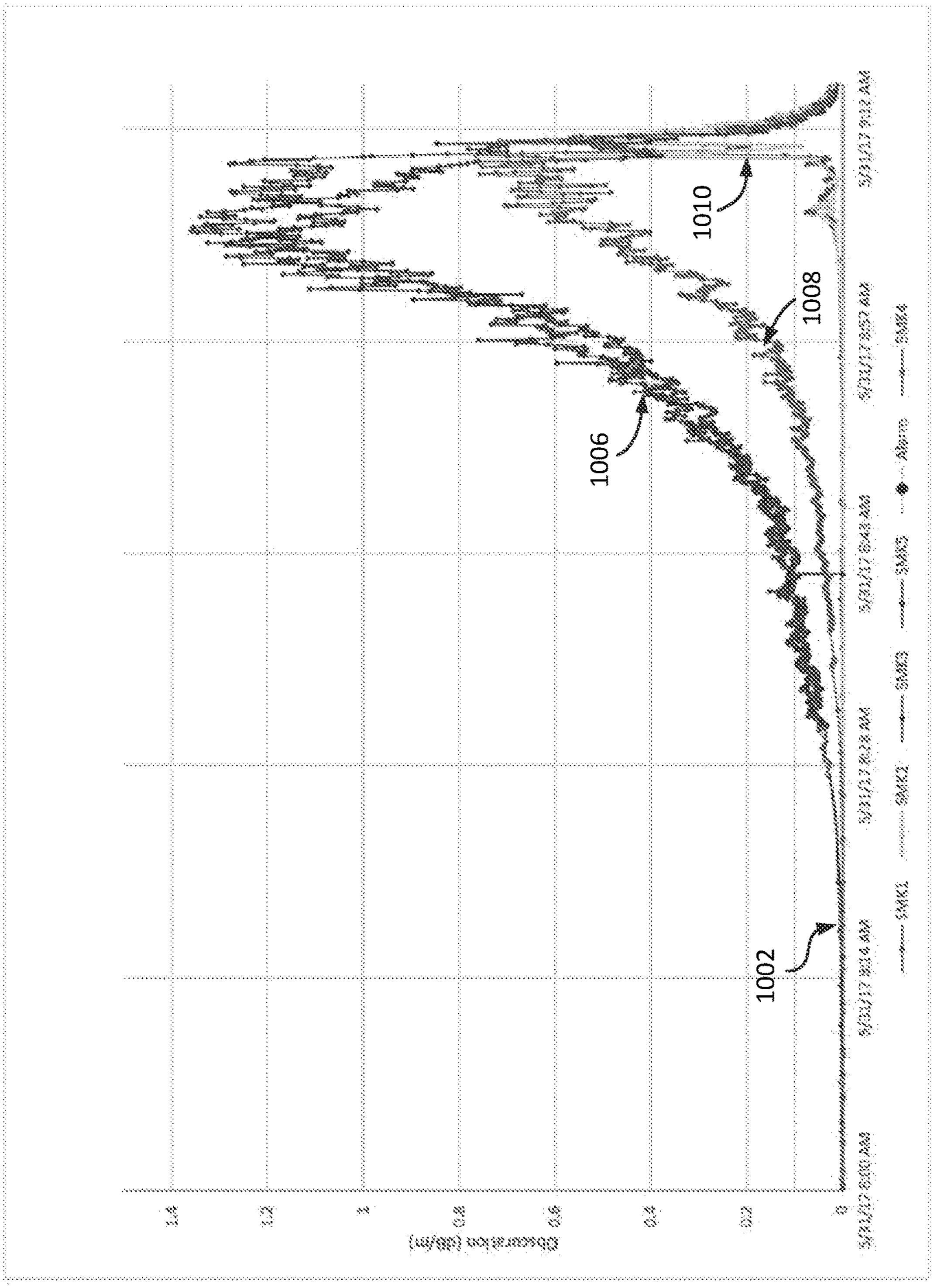

FIG. 12 shows the obscuration levels during a period where the ignition source was activated. Lines 1006 show smoke obscuration levels measured by the two smoke detectors nearest the ignition source. The obscuration levels begin to increase approximately 17 minutes after the ignition source is activated. Lines 1008 show obscuration levels from smoke detectors located toward a central region in the room 900 (see FIG. 9). Lastly, lines 1010 show obscuration levels from smoke detectors location toward the opposite side of the room as the ignition source. By comparing the obscuration levels between lines 1006, 1008, and 1010, the direction and speed of the smoke can be calculated as the fire continues to mature and spread. The fire temperature can also be inferred from the speed of the smoke (e.g., the smoke dispersion rate), as the greater the differential temperature, the faster smoke will dissipate through a building. In an illustrative embodiment, these parameters may be calculated as separate derived metrics by the computing device. These parameters may also provide an indication of the fire's probability and severity.

Figure 13:
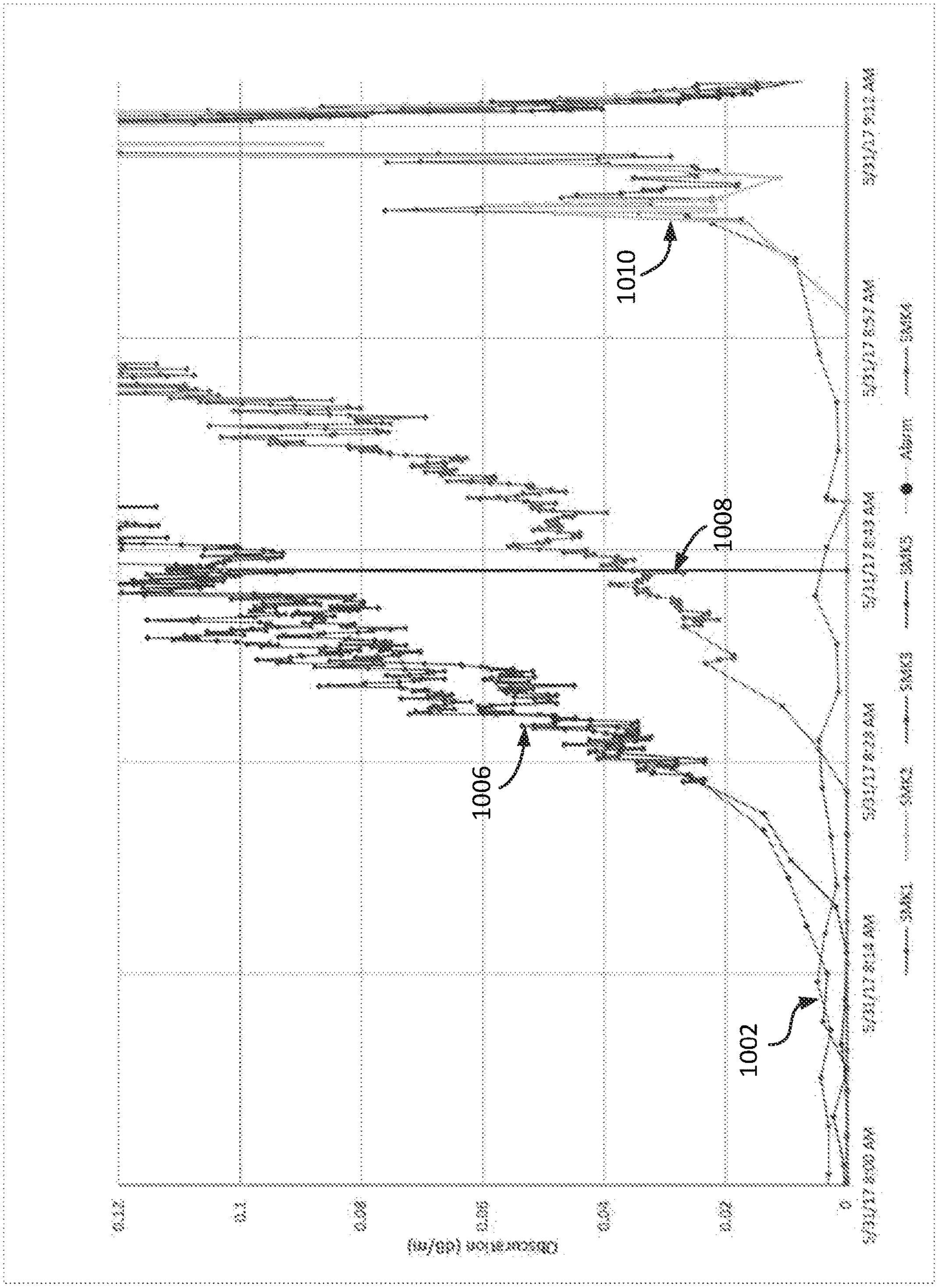

FIG. 13 shows the change in the reporting frequency of sensor data between the pre-test period (lines 1002) and the test period (lines 1006, 1008, 1010). As shown, the increase in reporting frequency accompanies an increase rate of change of sensor data from each of the detectors. In the illustrative embodiment shown, the measurement and reporting frequency of each sensory node increases by a factor of approximately 45 during periods where the rate of change exceeds a predetermined threshold rate of change.

Figure 14:
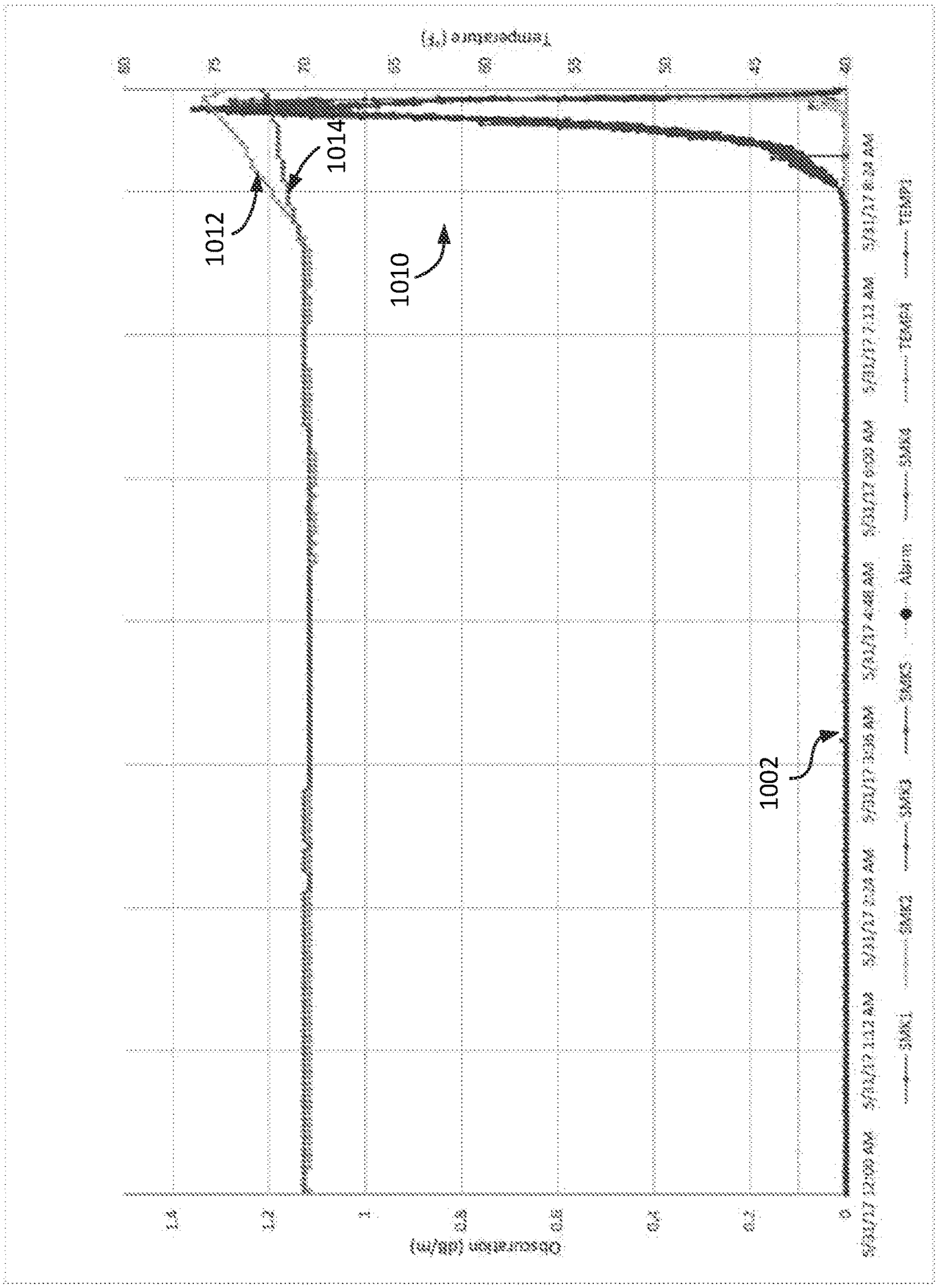
Figure 15:
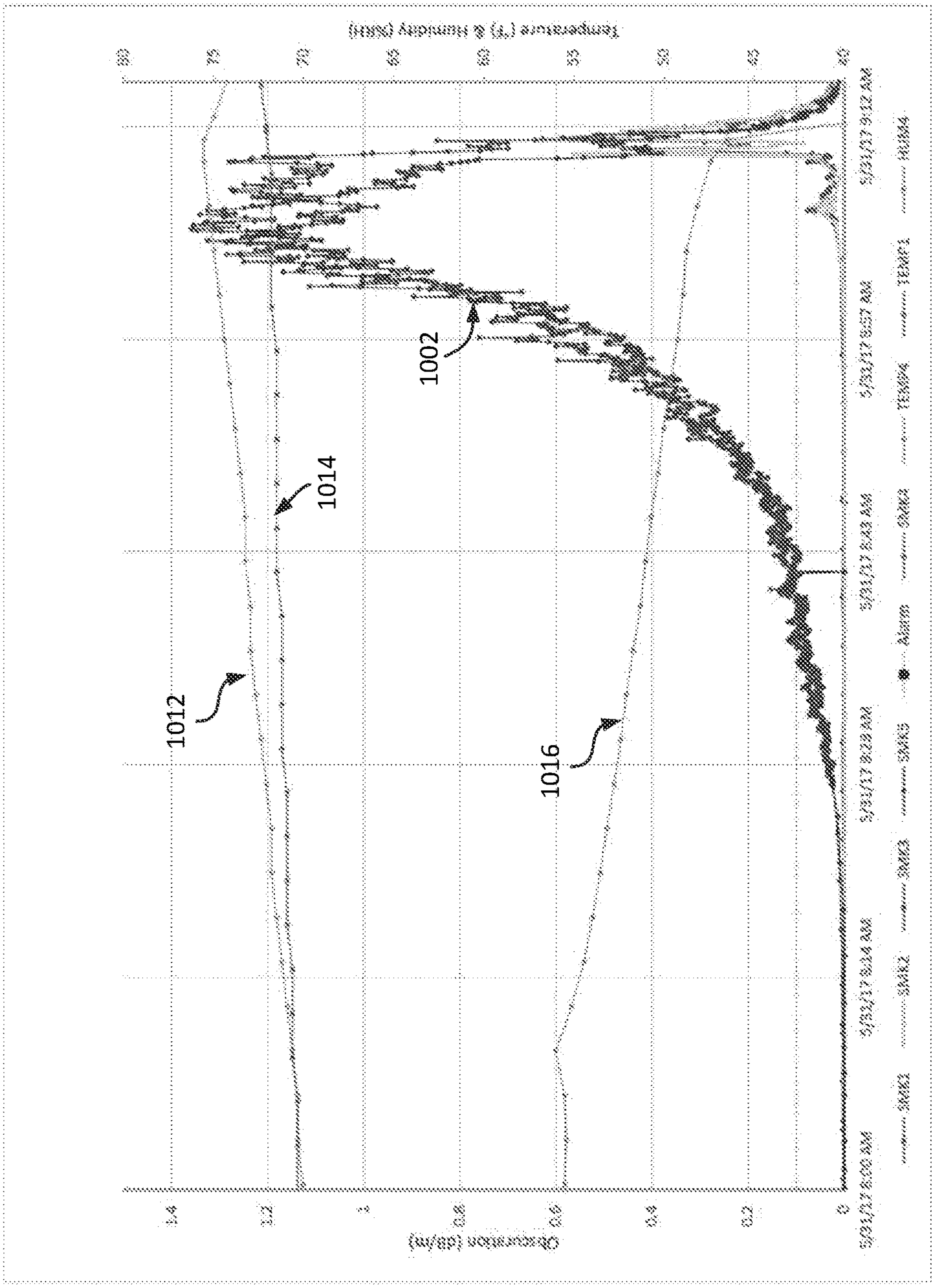

FIG. 14 shows sensor data from the temperature and RH data loggers over the test period. The primary y-axis shows the amount of smoke obscuration (dB/m), while the secondary y-axis (e.g., the y-axis on the right side of FIG. 14) is shows the temperature (° F.). Line 1012 shows the temperature directly over the ignition source. Line 1014 shows the temperature near the center (e.g., middle) of the room, away from the ignition source. FIG. 15 shows the sensor data during the period when the ignition source was activated. The primary y-axis shows the amount of smoke obscuration (dB/m), while the secondary y-axis shows both the temperature (° F.) and relative humidity (% RH). Line 1016 shows the humidity (e.g., relative humidity) measured near the center of the room. The fire detection system aggregates abnormal sensor data to determine the building abnormality value and fire probability, which further confirms the presence of a fire. The increase in obscuration (lines 1006 and lines 1010), increase in temperature (lines 1012, 1014), and decrease in humidity (line 1016), together provide a strong indication of a fire in-progress.

Figure 16:
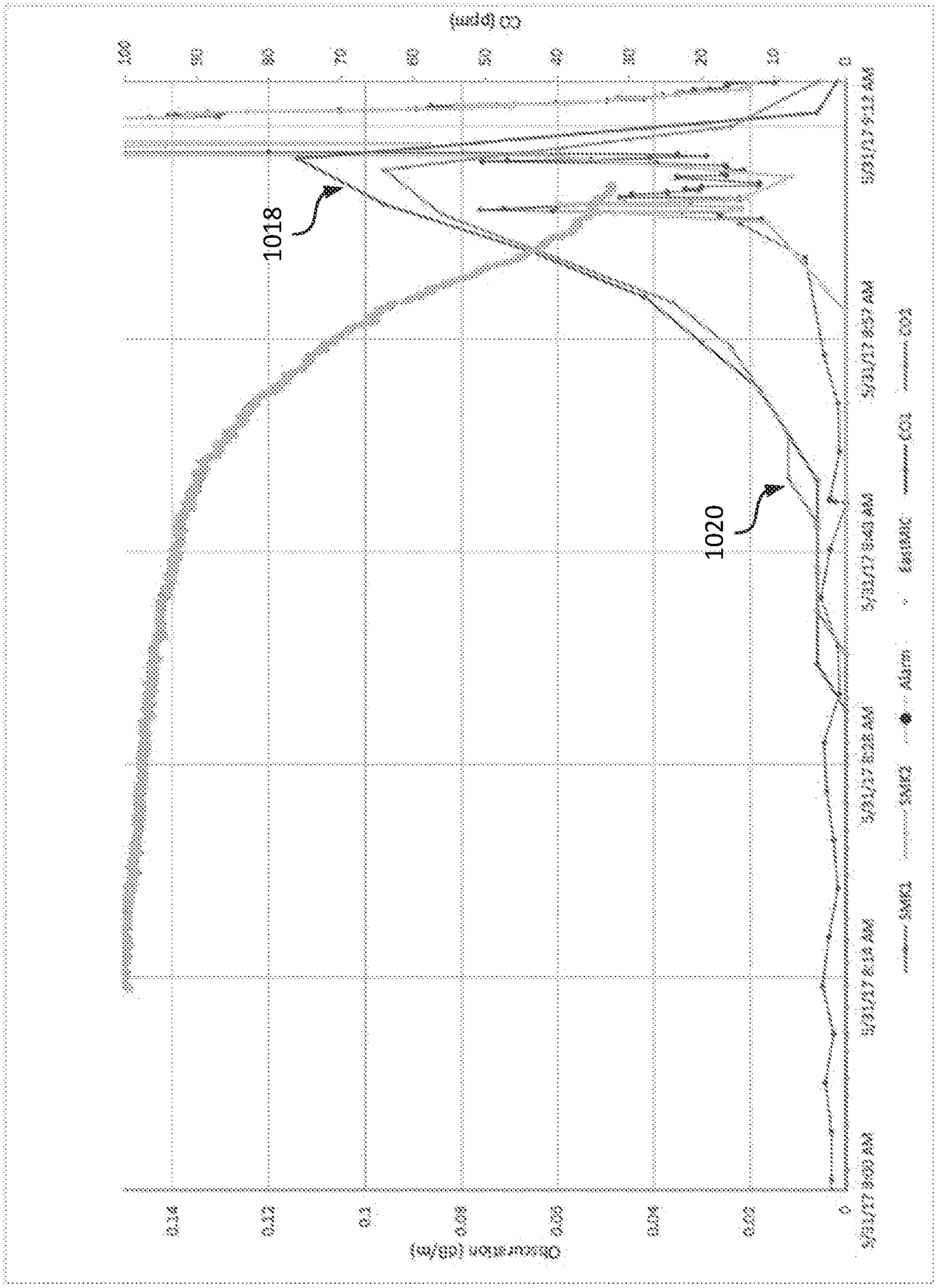

FIG. 16 shows sensor data collected from two different CO detectors during a period when the ignition source has been activated. The primary y-axis shows the amount of smoke obscuration (dB/m), while the secondary y-axis shows the amount of CO (parts per million). Line 1018 and line 1020 show the change in CO levels measured during the test. The CO measurements provide the fire detection system with an indication of whether a fire is burning or whether smoke obscuration levels are due to normal occupant activities such as showing, cooking, etc. (e.g., steam producing events). Additionally, CO has the ability to move without excessive heat, as shown by line 1018 and line 1020, which represent CO levels from CO detectors in two different locations within the room 900 (see FIG. 9). The fire detection system aggregates the CO measurements with sensor data from the smoke detectors to increase the reliability of the fire detection method.

Figure 17:
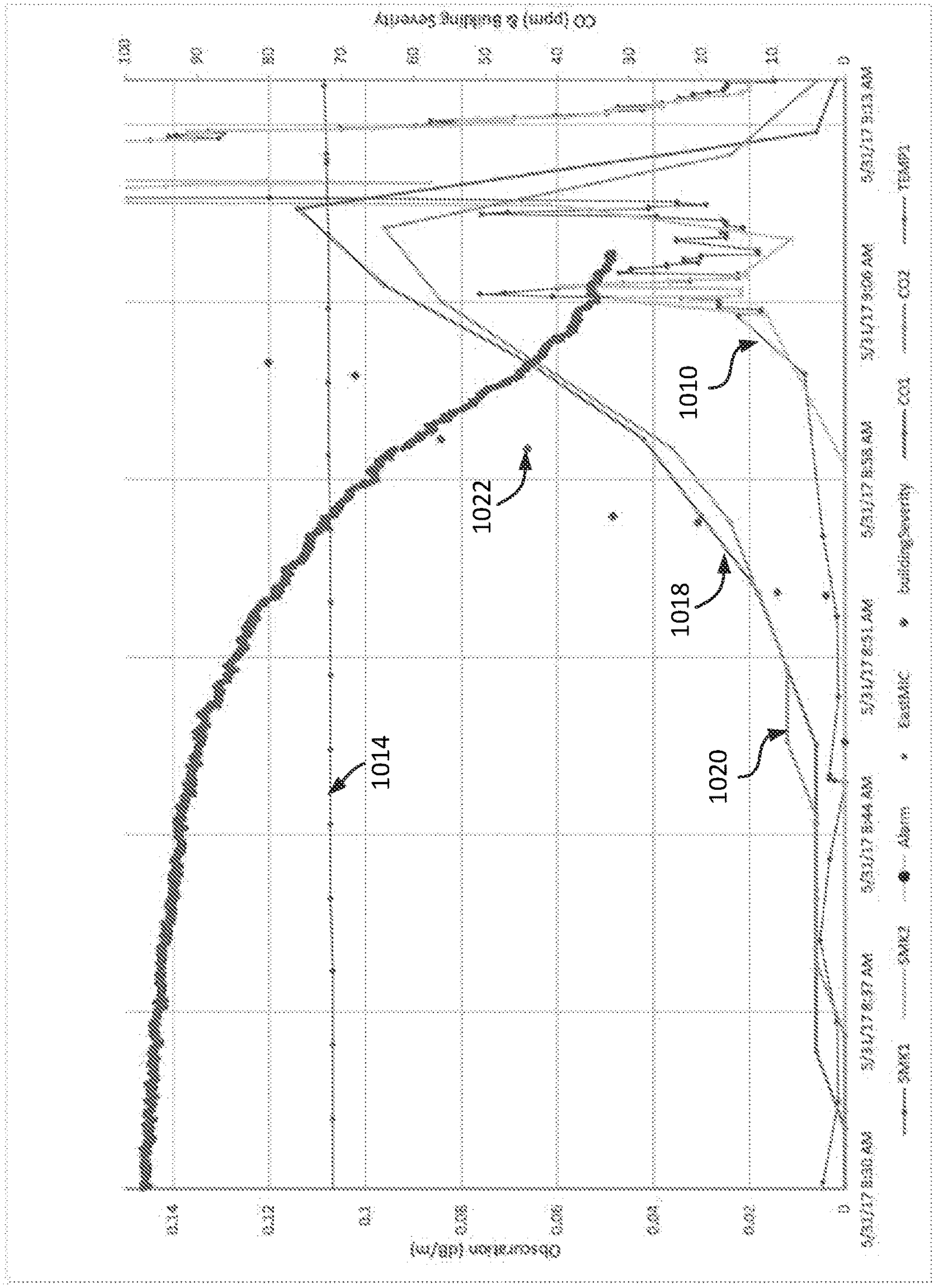

FIG. 17 shows sensor data collected from the CO detectors along with a calculated building abnormality value. The primary y-axis shows the amount of smoke obscuration (dB/m), while the secondary y-axis shows CO level (PPM) and building abnormality value (–). The fire detection system generates an alert at approximately 8:48 am based on an out-of-bounds condition reported by one of the sensory nodes (CO detector line 1020). The fire detection system determines a building abnormality value, shown as line 1022, in response to the alert. The building abnormality value continues to increase with rising CO levels (line 1018 and line 1020) and smoke obscuration levels (lines 1010), and temperature (line 1014).

Figure 18:
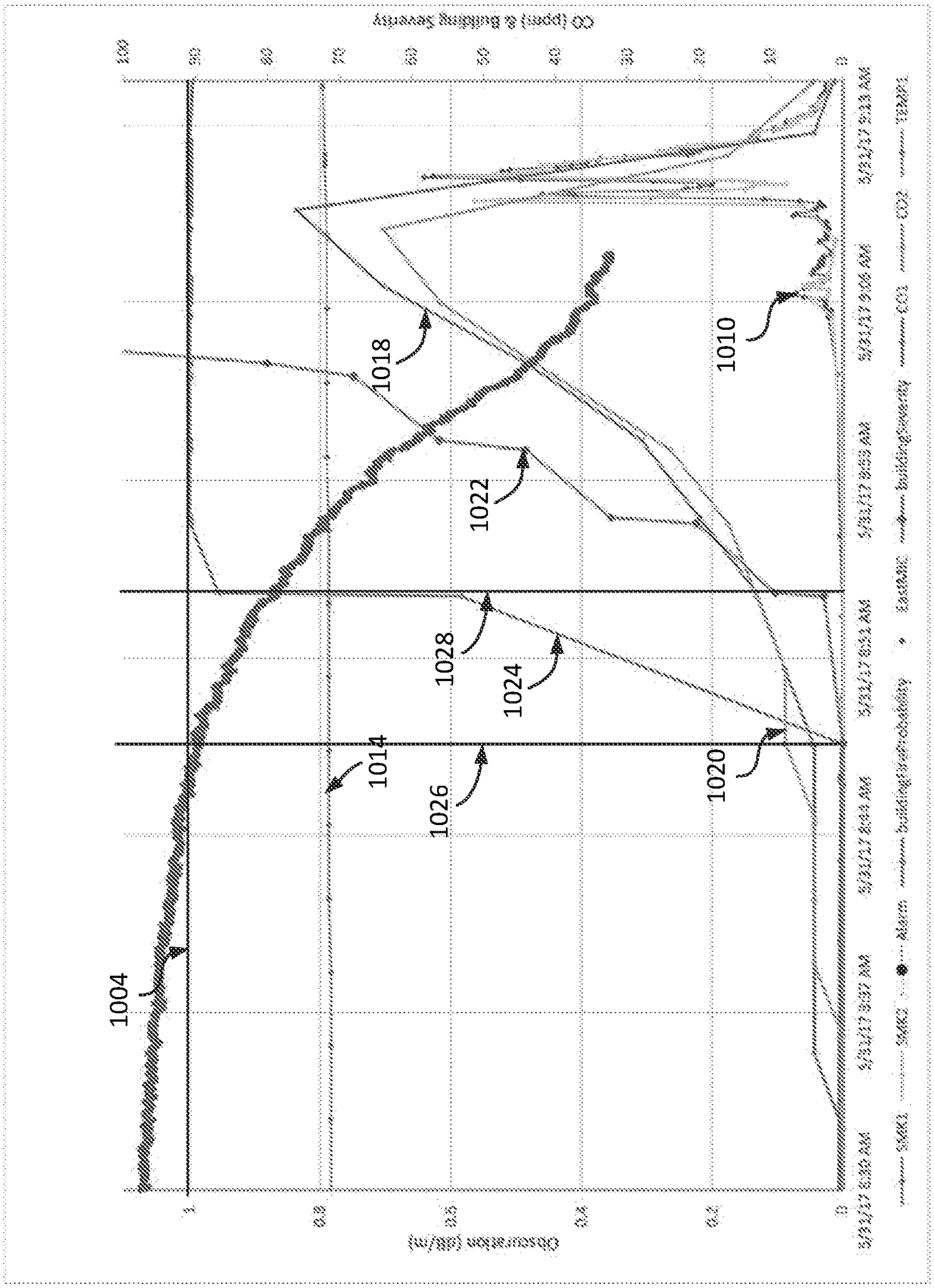

FIG. 18 shows a fire probability, shown as line 1024, as determined based on the building abnormality value. The primary y-axis shows the amount of smoke obscuration (dB/m), while the secondary axis shows the CO level (PPM), the building abnormality value (–), and the fire probability (%). As shown in FIG. 18, the fire probability increases from 0 at approximately 8:48 am, at a time indicated by vertical line 1026, to nearly 100 by approximately 8:54 am, at a time indicated by vertical line 1028. By 8:54 am, the building abnormality value (line 1022) has increased to a value greater than 9. The advanced predictive analysis provided a full 21 min and 48 s advanced notification of a fire in-progress in the room 900 (see FIG. 9) as compared to a smoke detector alone (e.g., a smoke detector configured to sound an alarm when the obscuration levels exceed 0.1 dB/m as shown by horizontal line 904). Note that the predictive analysis performed by the fire detection system also provided a significant warning in advance of any alarm that would have been provided by a CO detector alone, which may require parts per million levels of CO greater than 400 over a period of time lasting at least 15 mins before activating.

The foregoing example illustrates some aspects of the fire detection system and the benefits the predictive algorithms provide over standalone detectors. The fire detection system implements a method of learning normal patterns for sensor data from a plurality of sensory nodes. The method determines a building abnormality value based on abnormal sensor data. The building abnormality value may be used to provide advanced warning of a fire in a building. The method of fire detection may significantly increase egress times as compared to traditional, single detector, methods.

In an illustrative embodiment, any of the operations described herein are implemented at least in part as computer-readable instructions stored on a computer-readable memory. Upon execution of the computer-readable instructions by a processor, the computer-readable instructions can cause a computing device to perform the operations. For example, with reference to the method 700, the instructions may be operating instructions to facility processing of sensor data from multiple nodes of the plurality of sensory nodes. The instructions may include instructions to receive sensor data from each node. The instructions may also include instructions to determine a sensor specific abnormality value for each node of the plurality of sensory nodes. The instructions may further include instructions to determine, a building abnormality value in response to a condition where the sensor specific abnormality value for multiple nodes of the plurality of sensory nodes exceeds a threshold value. The instructions may also include instructions that cause an alarm or alter to be generated by each one of the plurality of sensory nodes based on the building abnormality value.

The foregoing description of various embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A fire detection system comprising:

a plurality of sensory nodes, each sensory node comprising:

a sensor;

a transmitter;

a memory; and a processor in communication with the sensor, the transmitter, and the memory;

the memory of the sensory node comprising instructions that when executed by the processor of the sensory node, cause the processor to receive sensory node location data and cause the sensor to receive condition data, the memory further comprising instructions that cause the transmitter to transmit the condition data and sensory node location data;

a computing device in electronic communication with the plurality of sensory nodes, the computing device comprising:

a transceiver;

a memory; and a processor, the processor in communication with the transceiver and the memory;

the memory of the computing device comprising instructions that when executed by the processor of the computing device, cause the computing device to receive sensory node data comprising condition data and sensory node location information data;

the memory of the computing device further comprising instructions that when executed by the processor of the computing device, cause the computing device to:

detect a condition identified by sensory node data value that is above a mandated level at a first sensory node at a first time;

detect the condition identified by sensory node data value that is above a mandated level at a second sensory node at a second time;

determine a rate of spread of the condition by determining a distance between the first sensory node and second sensory node and determining an elapsed time between the first time and the second time;

determine a severity based on a type of condition detected and the determined rate of spread of the condition.

2. The fire detection system of claim 1, wherein the determination of rate of spread of the condition is performed by software instructions that cause the processor of the computing device to:

identify a level of the condition detected at a first sensory node;

determine an amount of time before a level of the condition is detected at the second sensory node that is at least that of the level of the condition detected at the first sensory node;

determine a distance between the first sensory node and the second sensory node using the location of each node; and divide the distance by the determined amount of time.

3. The fire detection system of claim 2, wherein the step of determining a distance between the first sensory node and the second sensory node is performed using identification data for each sensor which comprise location information.

4. The fire detection system of claim 1, where identifying a condition is performed software instructions that cause the processor of the computing device to:

receive sensor data over time from each of the plurality of sensory nodes located within a building;

determine a sensor specific abnormality value for each of the plurality of sensory nodes; and determine that the sensor specific abnormality value for at least one node of the plurality of sensory nodes exceeds a threshold value.

5. The fire detection system of claim 4, wherein determining the sensor specific abnormality value for each node of the plurality of sensory nodes further comprises:

determining, by the computing device, a long term average of condition data over a first time interval; and determining, by the computing device, a control limit by adding or subtracting an offset value from the long term average.

6. The fire detection system of claim 4, wherein determining the sensor specific abnormality value for each node of the plurality of sensory nodes further comprises software instructions that cause the processor of the computing device to normalize a real-time value of condition data by a difference between the control limit and the long term average.

7. The fire detection system of claim 1, wherein the computing device determines a building abnormality value in response to a condition wherein a sensor specific abnormality value for multiple nodes of the plurality of sensory nodes exceeds a threshold value, wherein the building abnormality value is determined based on sensor data from the multiple nodes.

8. The fire detection system of claim 7, wherein the processor of the computing devices determines the building abnormality value by:

determining a cumulative distribution function based on condition data from a first time interval; and scaling the condition data using the cumulative distribution function.

9. The fire detection system of claim 7, wherein the processor determines the building abnormality value by executing software instructions to multiply the sensor data by a weighting factor determined based on a type of sensor data for each node of the plurality of sensory nodes, wherein the type of sensor data is one of an amount of smoke obscuration, a temperature, an amount of a gas, a humidity, and an amount of flammable material, wherein the weighting factor is largest for the type of sensor data that is an amount of smoke obscuration or the type of sensor data that is an amount of a gas.

10. The fire detection system of claim 7, wherein determining the building abnormality value is performed executing software instructions that cause the processor to multiply sensor data by a room factor, wherein the room factor is determined based on a number of rooms that include the at least one node.

11. The fire detection system of claim 1, further comprising software instructions that when executed by the processor of the computing device determine a spread of the condition by comparing sensory node data from the first sensory node to sensory node data from the second sensory node and using the location of the first sensory node and the location of the second sensory node to determine a distance between the first sensory node and the second sensory node.

12. A method of determining the severity of a condition comprising:

receiving by a first sensory node, condition data from a sensor of the first sensory node, and a location of the first sensory node;

transmitting by the first sensory node, the condition data and the location of the first sensory node;

receiving by a computing device, the condition data and the first sensory node location data;

identifying by the computing device, a level of sensory node data value that is above a mandated level at the first sensory node at a first time;

identifying by the computing device, a level of hazardous condition at a second sensory node at a second time where the level of sensory node data value that is above a mandated level at the second sensory node is at least that of the sensory node data value that is above a mandated level at the first sensory node at the first time;

determining a rate of spread of the condition by comparing the first time to the second time and the locations of the first sensory node and second sensory node;

determining a severity based on a type of condition detected and the determined rate of spread of the hazardous condition.

13. The method of claim 12, wherein the determination of rate of spread of the condition is performed by:

identifying a level of sensory node data detected at a first sensory node;

determining an amount of time before a level of the condition is detected at the second sensory node that is similar to the level of the condition detected at the first sensory node;

determining a distance between the first sensory node and the second sensory node; and dividing the distance by the determined amount of time.

14. The method of claim 13, wherein the step of determining a distance between the first sensory node and the second sensory node is performed using identification data for each sensor where the identification data comprises location information.

15. The method of claim 12, where identifying a condition is performed by:

receiving by the computing device, sensor data over time from each of the plurality of sensory nodes located within a building;

determining by the computing device, a sensor specific abnormality value for each of the plurality of sensory nodes; and determining that the sensor specific abnormality value for at least one node of the plurality of sensory nodes exceeds a threshold value.

16. The method of claim 15, wherein determining the sensor specific abnormality value for each node of the plurality of sensory nodes further comprises:

determining by the computing device, a long term average of sensor data over a first time interval; and determining by the computing device, a control limit by adding or subtracting an offset value from the long term average.

17. The method of claim 16, wherein determining the sensor specific abnormality value for each node of the plurality of sensory nodes further comprises normalizing a real-time value of sensor data by a difference between the control limit and the long term average.

18. The method of claim 12, further comprising determining a building abnormality value in response to a condition wherein a sensor specific abnormality value for multiple nodes of the plurality of sensory nodes exceeds a threshold value, wherein the building abnormality value is determined based on sensor data from the multiple nodes.

19. The method of claim 18, wherein determining the building abnormality value further comprises:

determining a cumulative distribution function based on sensor data from a first time interval; and scaling the sensor data using the cumulative distribution function.

20. The method of claim 12, further comprising determining a spread of the hazardous condition by comparing sensory node data from the first sensory node to sensory node data from the second sensory node and using the location of the first sensory node and the location of the second sensory node to determine a distance between the first sensory node and the second sensory node.

* * * * *